(12) United States Patent
Bonang et al.

(10) Patent No.: US 11,200,749 B2
(45) Date of Patent: Dec. 14, 2021

(54) SYSTEMS AND METHODS OF AUGMENTED REALITY VISUALIZATION BASED ON SENSOR DATA

(71) Applicant: THE BOEING COMPANY, Chicago, IL (US)

(72) Inventors: James Joseph Bonang, Garden Grove, CA (US); William J. Wood, Dove Canyon, CA (US); Thomas John Stepp, Long Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 17/098,620

(22) Filed: Nov. 16, 2020

(65) Prior Publication Data

US 2021/0082199 A1    Mar. 18, 2021

Related U.S. Application Data

(63) Continuation-in-part of application No. 16/516,738, filed on Jul. 19, 2019, now Pat. No. 10,896,547.

(51) Int. Cl.
| | |
|---|---|
| *G06T 19/00* | (2011.01) |
| *G06F 3/01* | (2006.01) |
| *G09G 5/36* | (2006.01) |
| *G01C 21/00* | (2006.01) |
| *G01C 21/20* | (2006.01) |

(52) U.S. Cl.
CPC ............ *G06T 19/006* (2013.01); *G01C 21/20* (2013.01); *G01C 21/3885* (2020.08);
(Continued)

(58) Field of Classification Search
CPC .......... G06T 19/006; G09G 5/36; G09G 5/38; G09G 2340/12; G09G 2370/04;
(Continued)

(56) References Cited

U.S. PATENT DOCUMENTS

| 9,541,763 B1 | 1/2017 | Heberlein et al. |
| 10,375,357 B2 | 8/2019 | Wang et al. |

(Continued)

OTHER PUBLICATIONS

Extended European Search Report dated Nov. 27, 2020 issued in corresponding EP Application No. EP20183647.5, pp. 1-9.
(Continued)

*Primary Examiner* — Abbas I Abdulselam
(74) *Attorney, Agent, or Firm* — Moore Intellectual Property Law, PLLC

(57) ABSTRACT

A device is configured to estimate a gaze target of a user of an augmented reality headset based on vehicle sensor data and headset sensor data. The device is configured to generate visualization data based on the gaze target. Responsive to determining that the gaze target is inside a first vehicle, the visualization data includes a first visual depiction of a first point of interest that is outside the first vehicle. The first point of interest includes at least a portion of a particular route of a particular vehicle. The particular vehicle includes the first vehicle or a second vehicle. Responsive to determining that the gaze target is outside the first vehicle, the visualization data includes a second visual depiction of a second point of interest that is inside the first vehicle.

20 Claims, 9 Drawing Sheets

(52) U.S. Cl.
CPC ............... *G06F 3/013* (2013.01); *G09G 5/36* (2013.01); *G09G 2354/00* (2013.01); *G09G 2370/04* (2013.01)

(58) Field of Classification Search
CPC ........ G09G 2354/00; G09G 2340/0464; G06F 3/011; G06F 3/012; G06F 3/147; G06F 3/013; G06K 9/00; G01C 21/20; G01C 21/3885; G02B 27/017
See application file for complete search history.

(56) References Cited

U.S. PATENT DOCUMENTS

| | | | |
|---|---|---|---|
| 2016/0187651 | A1 | 6/2016 | Border et al. |
| 2018/0011533 | A9 | 1/2018 | Marggraff et al. |
| 2018/0033199 | A9 | 2/2018 | Eatedali et al. |
| 2018/0190029 | A1 | 7/2018 | Stein et al. |
| 2018/0239144 | A1 | 8/2018 | Woods et al. |
| 2018/0308454 | A1 | 10/2018 | Gusikhin et al. |
| 2018/0365902 | A1 | 12/2018 | Tomatsu |
| 2021/0019942 | A1* | 1/2021 | Ophir ................. G06K 9/00671 |

OTHER PUBLICATIONS

Automatic Identification System, https://en.wikipedia.org/wiki/Automatic_identification_system, printed on Aug. 24, 2020, pp. 1-13.

Boeing P-8 Poseidon, https://en.wikipedia.org/wiki/Boeing_P-8_Poseidon, printed on Aug. 24, 2020, pp. 1-15.

Bradley Fighting Vehicle, https://en.wikipedia.org/wiki/Bradley_Fighting_Vehicle, printed on Aug. 24, 2020, pp. 1-10.

Force XXI Battle Command Brigade and Below, https://military.wikia.org/wiki/Force_XXI_Battle_Command_Brigade_and_Below, printed on Aug. 24, 2020, pp. 1-2.

http://www.nationaldefensemagazine.org/articles/2019/1/23/harris-corp-announces-entry-for-armys-night-vision-binocular-program, printed on Aug. 18, 2020, pp. 1-5.

http://www.nationaldefensemagazine.org/articles/2019/1/24/FLIR-introduces-smaller-lighter-range-finder-for-scouts, printed on Aug. 18, 2020, pp. 1-4.

https://www.cnbc.com/2019/04/06/Microsoft-Hololens-2-Army-Plans-to-Customize-as-IVAS.html, printed on Aug. 18, 2020, pp. 1-16.

https://www.flir.com/globalassets/imported-assets/document/flir-recon-v-ultra-lite-datasheet.pdf, printed on Aug. 18, 2020, pp. 1-2.

M1 Abrams, https://en.wikipedia.org/wiki/M1_Abrams, printed on Aug. 24, 2020, pp. 1-26.

NAVAIR Flight Ready: P-8A Poseidon Guardian of the Seas, Naval Air Systems Command, 2017, https://www.youtube.com/watch?v=aRn66PNbvSE, printed on Aug. 24, 2020, pp. 1-4.

Taiwan Says It's Complying with North Korea Sanctions, https://www.marinelink.com/news/taiwan-says-complying-north-korea-478617, printed on Aug. 24, 2020, pp. 1-4.

The Legacy of YG 84/85/86 Could Be: We Fixed Navy Manning!, https://blog.usni.org/posts/2018/12/11/the-legacy-of-yg-848586-could-be-we-fixed-navy-manning, printed on Aug. 24, 2020, pp. 1-9.

* cited by examiner

SYSTEMS AND METHODS OF AUGMENTED REALITY VISUALIZATION BASED ON SENSOR DATA

CROSS-REFERENCE TO RELATED APPLICATIONS

This application claims priority from, and is a continuation-in-part of, U.S. patent application Ser. No. 16/516,738, filed Jul. 19, 2019, the entire content of which is expressly incorporated by reference herein.

FIELD OF THE DISCLOSURE

The present disclosure is generally related to augmented reality visualization.

BACKGROUND

Augmented reality (AR) is rapidly changing the way people interact with computer systems and the environment. This technology is expected to broadly impact aerospace and defense. Crew members (e.g., of commercial aircraft, military aircraft, ships, and ground vehicles) typically maintain situational awareness across two distinct contexts: information presented primarily on fixed, two-dimensional computer displays and the three-dimensional external environment. Crew members transition between these two contexts by redirecting their gaze or by physically moving between a console and a window. A mental transition also occurs, e.g., as a crew member attempts to map between two-dimensional graphics and three-dimensional terrain. Size and weight constraints can limit a number of fixed displays, so some crew members may not have access to information as and where needed.

SUMMARY

In a particular implementation, a device for augmented reality visualization includes an interface and one or more processors. The interface is configured to receive vehicle sensor data from one or more vehicle sensors coupled to a first vehicle. The interface is also configured to receive headset sensor data from one or more headset sensors coupled to an augmented reality headset. The one or more processors are configured to determine, based on the vehicle sensor data and the headset sensor data, an orientation and a location of the augmented reality headset relative to the first vehicle. The one or more processors are also configured to estimate a gaze target of a user of the augmented reality headset based on the headset sensor data and the orientation and the location of the augmented reality headset relative to the first vehicle. The one or more processors are further configured to generate visualization data based on the gaze target. Responsive to determining that the gaze target is inside the first vehicle, the visualization data includes a first visual depiction of a first point of interest that is outside the first vehicle. The first point of interest includes at least a portion of a particular route of a particular vehicle. The particular vehicle includes the first vehicle or a second vehicle. Responsive to determining that the gaze target is outside the first vehicle, the visualization data includes a second visual depiction of a second point of interest that is inside the first vehicle. The one or more processors are also configured to send the visualization data to a display of the augmented reality headset.

In another particular implementation, a method of augmented reality visualization includes receiving, at a device, vehicle sensor data from one or more vehicle sensors coupled to a first vehicle. The method also includes receiving, at the device, headset sensor data from one or more headset sensors coupled to an augmented reality headset. The method further includes determining, based on the vehicle sensor data and the headset sensor data, an orientation and a location of the augmented reality headset relative to the first vehicle. The method also includes estimating, at the device, a gaze target of a user of the augmented reality headset based on the headset sensor data and the orientation and the location of the augmented reality headset relative to the first vehicle. The method further includes generating, at the device, visualization data based on the gaze target. Responsive to determining that the gaze target is inside the first vehicle, the visualization data includes a first visual depiction of a first point of interest that is outside the first vehicle. The first point of interest includes at least a portion of a particular route of a particular vehicle. The particular vehicle includes the first vehicle or a second vehicle. Responsive to determining that the gaze target is outside the first vehicle, the visualization data includes a second visual depiction of a second point of interest that is inside the first vehicle. The method also includes sending the visualization data from the device to a display of the augmented reality headset.

In another particular implementation, a computer-readable storage device stores instructions that, when executed by one or more processors, cause the one or more processors to receive vehicle sensor data from one or more vehicle sensors coupled to a first vehicle. The instructions, when executed by the one or more processors, also cause the one or more processors to receive headset sensor data from one or more headset sensors coupled to an augmented reality headset. The instructions, when executed by the one or more processors, further cause the one or more processors to determine, based on the vehicle sensor data and the headset sensor data, an orientation and a location of the augmented reality headset relative to the first vehicle. The instructions, when executed by the one or more processors, also cause the one or more processors to estimate a gaze target of a user of the augmented reality headset based on the headset sensor data and the orientation and the location of the augmented reality headset relative to the first vehicle. The instructions, when executed by the one or more processors, further cause the one or more processors to generate visualization data based on the gaze target. Responsive to determining that the gaze target is inside the first vehicle, the visualization data includes a first visual depiction of a first point of interest that is outside the first vehicle. The first point of interest includes at least a portion of a particular route of a particular vehicle. The particular vehicle includes the first vehicle or a second vehicle. Responsive to determining that the gaze target is outside the first vehicle, the visualization data includes a second visual depiction of a second point of interest that is inside the first vehicle. The instructions, when executed by the one or more processors, also cause the one or more processors to send the visualization data to a display of the augmented reality headset.

In another particular implementation, a device for augmented reality visualization includes an interface and one or more processors. The interface is configured to receive vehicle sensor data from one or more vehicle sensors coupled to a vehicle. The interface is also configured to receive headset sensor data from one or more headset sensors coupled to an augmented reality headset. The one or more processors are configured to determine, based on the vehicle sensor data, a movement of the vehicle. The one or more processors are also configured to determine, based on the headset sensor data, a movement of the augmented reality headset. The one or more processors are further configured to estimate, based on a comparison of the movement of the vehicle and the movement of the augmented reality headset, a user portion of the movement of the augmented reality headset caused by a movement of a head of a user of the augmented reality headset and not caused by the movement of the vehicle. The one or more processors are also configured to determine, based on the user portion of the movement of the augmented reality headset, an orientation and a location of the augmented reality headset relative to the vehicle. The one or more processors are further configured to estimate a gaze target of the user based on the headset sensor data and the orientation and the location of the augmented reality headset relative to the vehicle. The one or more processors are also configured to generate visualization data based on the gaze target. Responsive to determining that the gaze target is inside the vehicle, the visualization data includes a first visual depiction of a first point of interest that is outside the vehicle. Responsive to determining that the gaze target is outside the vehicle, the visualization data includes a second visual depiction of a second point of interest that is inside the vehicle. The one or more processors are further configured to send the visualization data to a display of the augmented reality headset.

In another particular implementation, a method of augmented reality visualization includes receiving, at a device, vehicle sensor data from one or more vehicle sensors coupled to a vehicle. The method also includes receiving, at the device, headset sensor data from one or more headset sensors coupled to an augmented reality headset. The method further includes determining, based on the vehicle sensor data and the headset sensor data, an orientation and a location of the augmented reality headset relative to the vehicle. The method also includes estimating, based at least in part on the orientation and the location of the augmented reality headset relative to the vehicle, a gaze target of a user of the augmented reality headset. The method further includes generating, at the device, visualization data based on the gaze target. Responsive to determining that the gaze target is inside the vehicle, the visualization data includes a first visual depiction of a first point of interest that is outside the vehicle. Responsive to determining that the gaze target is outside the vehicle, the visualization data includes a second visual depiction of a second point of interest that is inside the vehicle. The method also includes sending the visualization data from the device to a display of the augmented reality headset.

In another particular implementation, a computer-readable storage device stores instructions that, when executed by a processor, cause the processor to perform operations including receiving vehicle sensor data from one or more vehicle sensors coupled to a vehicle. The operations also include receiving headset sensor data from one or more headset sensors coupled to an augmented reality headset. The operations further include estimating, based on the vehicle sensor data and the headset sensor data, a gaze target of a user of the augmented reality headset. The operations also include generating visualization data based on the gaze target. Responsive to determining that the gaze target is inside the vehicle, the visualization data includes a first visual depiction of a first point of interest that is outside the vehicle. Responsive to determining that the gaze target is outside the vehicle, the visualization data includes a second visual depiction of a second point of interest that is inside the vehicle. The operations further include sending the visualization data to a display of the augmented reality headset.

The features, functions, and advantages described herein can be achieved independently in various implementations or may be combined in yet other implementations, further details of which can be found with reference to the following description and drawings.

DETAILED DESCRIPTION

Figure 1:
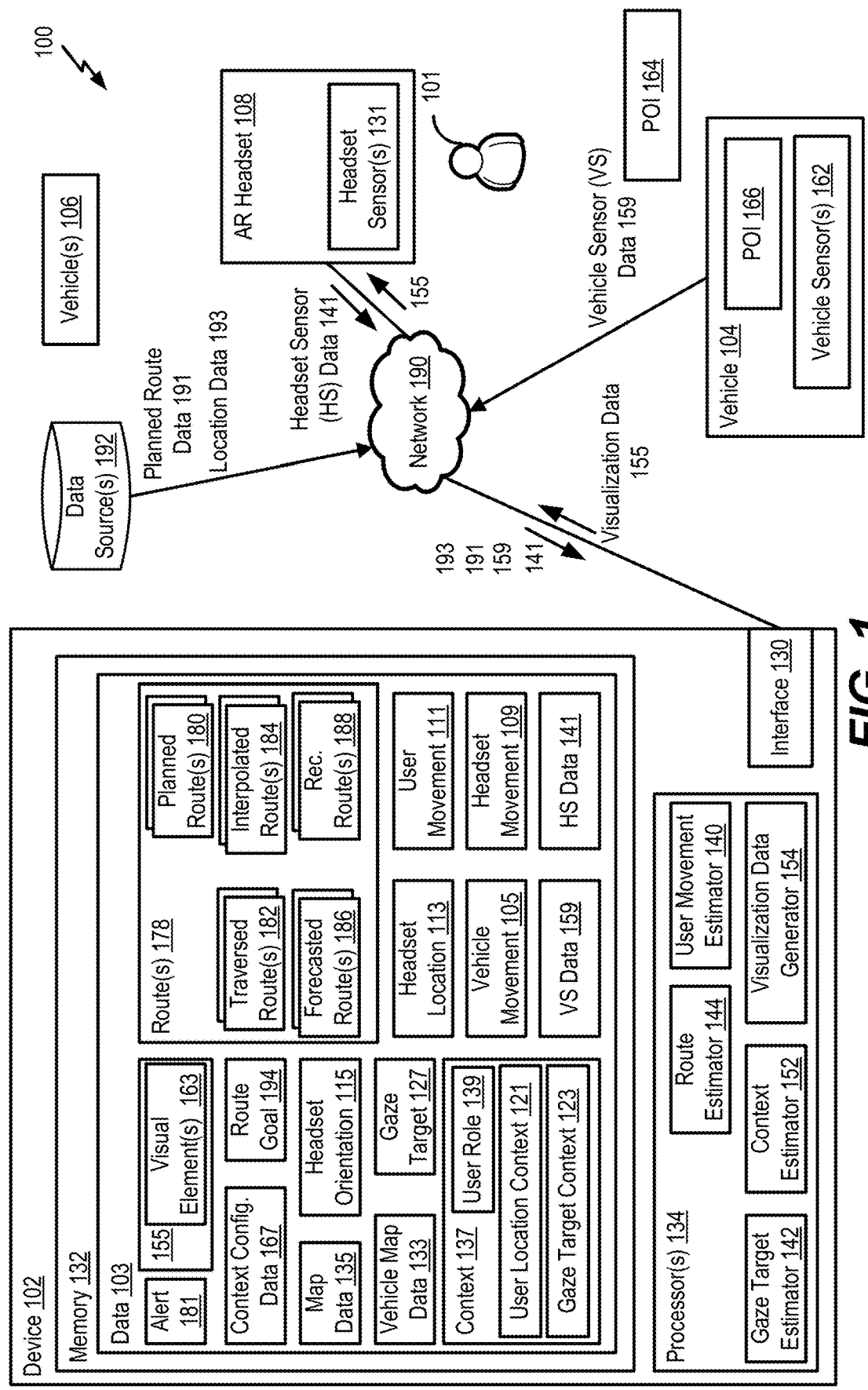
FIG. 1 is a block diagram that illustrates a system operable to perform augmented reality visualization.

Implementations described herein are directed to augmented reality visualizations. In a particular example, a user in a vehicle wears an augmented reality (AR) headset. A device receives headset sensor data from one or more headset sensors coupled to the AR headset. The device also receives vehicle sensor data from one or more vehicle sensors coupled to the vehicle. A user movement estimator of the device determines a user portion of a movement of the AR headset caused by a movement of a head of the user and not caused by a movement of the vehicle. In a particular example, the user turns 5 degrees to look in a direction of an instrument panel in the vehicle and the vehicle turns left. In this example, the vehicle sensor data indicates that the vehicle has turned 90 degrees. The headset sensor data indicates that the AR headset has turned 95 degrees (90 degrees due to the movement of the vehicle+5 degrees due to user movement). The user movement estimator determines a user portion of the movement of the AR headset based on a comparison of the movement of the AR headset (e.g., 95 degrees) and the movement of the vehicle (e.g., 90 degrees). For example, the user movement estimator determines that the user portion indicates a 5 degree movement relative to the vehicle based on determining that a net of the movement of the AR headset and the movement of the vehicle is 5 degrees. In another example, the user movement estimator determines that the user portion indicates no movement based on determining that the movement of the AR headset matches the movement of the vehicle.

A gaze target estimator estimates a gaze target of the user based on the user portion of the movement of the AR headset. The gaze target indicates where the user is looking at a particular time. In a particular example, the gaze target estimator determines, based on the user portion of the movement of the AR headset, an orientation and location of the AR headset relative to the vehicle. The gaze target estimator determines, based on the orientation and location of the AR headset, that the user is looking in the direction of an instrument panel of the vehicle. In some implementations, the headset sensor data includes image sensor data. In such implementations, the gaze target estimator performs image recognition on the image sensor data to determine that the gaze target includes a particular instrument of the instrument panel. In another example, the gaze target can indicate that the user is looking in the direction of a location external to the vehicle (e.g., outside a window).

A visualization data generator generates visualization data for the AR headset based on the gaze target and a context at the particular time. For example, the context indicates whether the user is in the vehicle or outside the vehicle. In some examples, the context indicates a role of the user. The visualization data may differ based on context for the same gaze target. For example, the visualization data may include an indicator identifying a ship for a user looking at the ship from inside an airplane, and may include a visual depiction of a wind speed meter for a user (e.g., a paratrooper) looking at the ship from outside the airplane. As another example, the visualization data may include a three-dimensional rotatable map with visual depictions of objects when the user gaze target is inside the vehicle and may include indicators marking locations of the objects when the user gaze target is outside the vehicle. In some examples, the visualization data may include an indicator marking a location of an object outside the vehicle although the object is not visible (e.g., behind cloud cover or another object) to the user. In some examples, the visualization data indicates at least a portion of a route of a vehicle. For example, the visualization data may include a three-dimensional rotatable map with visual depictions of routes of one or more vehicles when the user gaze target is inside the vehicle. As another example, the visualization data may include indicators marking routes of the one or more vehicles when the user gaze target is outside the vehicle.

In a particular example, the visualization data reduces the mental workload of the user when visually moving from one context to another. For example, the visualization data includes a visual depiction of an object (e.g., a ship, a portion of a route of the ship, or both) in a first context (e.g., a map displayed inside the vehicle) and includes an indicator to mark a location of the object (e.g., the ship, the portion of the route of the ship, or both) in a second context (e.g., outside the vehicle). The indicator includes at least one visual element, such as a color, an image, a video, an animation, a symbol, text, a pattern, or a combination thereof, in common with the visual depiction. Having similar visual elements for the same object helps the user detect the corresponding object in different contexts.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 including one or more processors ("processor(s)" 134 in FIG. 1), which indicates that in some implementations the device 102 includes a single processor 134 and in other implementations the device 102 includes multiple processors 134. For ease of reference herein, such features are generally introduced as "one or more" features and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating", "calculating", "using", "selecting", "accessing", and "determining" are interchangeable unless context indicates otherwise. For example, "generating", "calculating", or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 is a block diagram of a system 100 that is operable to perform augmented reality visualization. The system 100 includes a device 102 coupled, via a network 190, to an augmented reality (AR) headset 108 and to a vehicle 104. The network 190 includes a wired network, a wireless network, or both. The AR headset 108 includes (or is coupled to) one or more headset sensors 131. The headset sensor 131 includes an accelerometer, a gyroscope, a magnetometer, an inertial measurement unit, an image sensor, a global positioning system (GPS) receiver, a beacon, or a combination thereof. The headset sensor 131 is configured to generate headset sensor (HS) data 141. The vehicle 104 includes (or is coupled to) one or more vehicle sensors 162. The vehicle sensor 162 includes a radar receiver, a sonar hydrophone, a maritime surface search radar receiver, an acoustic sensor, a seismic sensor, a ground surveillance radar receiver, a passive sonar hydrophone, a passive radar receiver, a doppler radar receiver, an accelerometer, a gyroscope, a magnetometer, an inertial measurement unit, an image sensor, a GPS receiver, a beacon, or a combination thereof. The vehicle sensor 162 is configured to generate vehicle sensor (VS) data 159.

It should be noted that in the following description, various functions performed by the system 100 of FIG. 1 are described as being performed by certain components or modules. However, this division of components and modules is for illustration only. In an alternate aspect, a function described herein as performed by a particular component or module is divided amongst multiple components or modules. Moreover, in an alternate aspect, two or more components or modules of FIG. 1 are integrated into a single component or module. Each component or module illustrated in FIG. 1 can be implemented using hardware (e.g., a field-programmable gate array (FPGA) device, an application-specific integrated circuit (ASIC), a digital signal processor (DSP), a controller, etc.), software (e.g., instructions executable by a processor), or any combination thereof.

The device 102 includes a memory 132, one or more processors 134, and an interface 130. The interface 130 includes a communication interface, a network interface, an application interface, or a combination thereof. The memory 132 is configured to store data 103 that is used (e.g., generated) by the processor 134. In some aspects, a portion of the data 103 is stored in the memory 132 at any given time. The interface 130 is configured to communicate with the network 190. The processor 134 includes a user movement estimator 140, a gaze target estimator 142, a route estimator 144, a context estimator 152, a visualization data generator 154, or a combination thereof. The user movement estimator 140 is configured to estimate a headset movement 109 of the AR headset 108 based on the HS data 141 and to estimate a vehicle movement 105 of the vehicle 104 based on the VS data 159. The user movement estimator 140 is configured to estimate a user movement 111 based on a comparison of the headset movement 109 and the vehicle movement 105. The user movement 111 corresponds to a user portion of the headset movement 109 caused by a movement of a head of a user 101 of the AR headset 108 and not caused by the vehicle movement 105.

The gaze target estimator 142 is configured to estimate a gaze target 127 (e.g., a locus of a gaze) of the user 101 based on the user movement 111. In a particular example, the gaze target estimator 142 is configured to determine, based on the user movement 111, a headset orientation 115, a headset location 113, or both, of the AR headset 108 relative to the vehicle 104. To illustrate, the user movement 111 indicates that the AR headset 108 moved by a particular angle (e.g., 5 degrees), a particular distance, or both, relative to the vehicle 104. The headset orientation 115 indicates that the user 101 is looking in a particular direction relative to (e.g., 10 degrees from the front of) the vehicle 104. The headset location 113 indicates a location of the AR headset 108 relative to (e.g., in) the vehicle 104.

In a particular aspect, the gaze target estimator 142 is configured to determine the gaze target 127 based on the headset orientation 115, the headset location 113, or both. For example, the gaze target estimator 142 determines that the gaze target 127 includes a particular instrument panel of the vehicle 104. As another example, the gaze target estimator 142 determines that the gaze target 127 includes a window of the vehicle 104.

In a particular aspect, the gaze target estimator 142 is configured to determine (e.g., refine) the gaze target 127 by performing image recognition on the HS data 141. For example, the gaze target estimator 142 is configured to determine, based on the image recognition, that the gaze target 127 includes a particular instrument of the instrument panel. As another example, the gaze target estimator 142 is configured to determine, based on the image recognition, that the gaze target 127 includes a particular object outside the vehicle 104 that is visible through the window.

The route estimator 144 is configured to determine one or more routes 178 of the vehicle 104, one or more routes of one or more vehicles 106, or a combination thereof. For example, the routes 178 include one or more planned routes 180, one or more traversed routes 182, one or more interpolated routes 184, one or more forecasted routes 186, one or more recommended routes 188, or a combination thereof. For example, a vehicle is intended to travel a planned route 180 from an origin to a destination. The vehicle is detected as having traveled a traversed route 182 from a first location to a second location. In some examples, the first location includes the origin and the second location is between the origin and the destination. In other examples, in situations where the vehicle has been re-routed from the planned route 180 for various reasons, such as traffic, weather, obstacles, etc., the second location is not between the origin and the destination. In a particular example, the VS data 159 (e.g., GPS data, radar data, sonar data, or a combination thereof) indicates that the vehicle is detected at an estimated location. An interpolated route 184 is determined for the vehicle from the second location to the estimated location. A forecasted route 186 of the vehicle indicates an anticipated route of the vehicle from the estimated location to a forecasted location on the planned route 180. A recommended route 188 of the vehicle satisfies a route goal 194. The route goal 194 includes obstacle avoidance, collision avoidance, bad weather avoidance, an area avoidance, a time goal, a fuel consumption goal, a cost goal, or a combination thereof.

The context estimator 152 is configured to determine a context 137. For example, the context 137 includes a user role 139 of the user 101, a user location context 121 (e.g., whether the user 101 is inside or outside the vehicle 104), a gaze target context 123 (e.g., a location of the object that the user is looking at), or a combination thereof. The visualization data generator 154 is configured to generate visualization data 155 based on the gaze target 127 (e.g., what the user 101 is looking at), the context 137, the route 178, or a combination thereof. For example, the visualization data 155 includes one or more visual elements 163 (e.g., virtual elements) that are selected based on the gaze target 127, the context 137, the route 178, or a combination thereof. The visualization data generator 154 is configured to send the visualization data 155 to a display of the AR headset 108.

During operation, the user 101 activates (e.g., powers up) the AR headset 108. The headset sensor 131 generates the HS data 141. For example, the headset sensor 131 generates the HS data 141 during a first time range. To illustrate, one or more sensors of the headset sensor 131 generate data continuously, at various time intervals, responsive to detecting an event, or a combination thereof, during the first time range. An event can include receiving a request from the device 102, receiving a user input, detecting a movement of the AR headset 108, or a combination thereof.

The device 102 receives the HS data 141 from the AR headset 108. For example, the AR headset 108 sends the HS data 141 to the device 102 continuously, at various time intervals, responsive to detecting an event, or a combination thereof. An event can include receiving a request from the device 102, receiving a user input, detecting a movement of the AR headset 108, detecting an update of the HS data 141, or a combination thereof.

The vehicle sensor 162 generates the VS data 159. For example, the vehicle sensor 162 generates the VS data 159 during a second time range. In a particular aspect, the second time range is the same as, overlaps, or is within a threshold duration (e.g., 5 minutes) of the first time range. To illustrate, one or more sensors of the vehicle sensor 162 generate data continuously, at various time intervals, responsive to detecting an event, or a combination thereof, during the second time range. An event can include receiving a request from the device 102, receiving a user input, detecting a movement of the vehicle 104, or a combination thereof.

The device 102 receives the VS data 159 from the vehicle 104. For example, the vehicle 104 sends the VS data 159 to the device 102 continuously, at various time intervals, responsive to detecting an event, or a combination thereof. An event can include receiving a request from the device 102, receiving a user input, detecting a movement of the vehicle 104, detecting an update of the VS data 159, or a combination thereof.

In a particular aspect, the device 102 receives, via the interface 130, planned route data 191, location data 193, or a combination thereof, from one or more data sources 192, the vehicle 104, the vehicle 106, or a combination thereof. The one or more data sources 192, the vehicle 104, the vehicle 106, or a combination thereof, send the planned route data 191, the location data 193, or a combination thereof, to the device 102 continuously, at various time intervals, responsive to detecting an event, or a combination thereof. An event can include receiving a request from the device 102, receiving a user input, or a combination thereof. In a particular aspect, the one or more data sources 192 include a shore station, a satellite, an aircraft communications addressing and reporting system (ACARS), a blue force tracker (BFT), or a combination thereof.

In a particular example, the device 102 receives planned route data 191A of the vehicle 104 from the vehicle 104, via user input (e.g., from an operator of the vehicle 104), or both. The planned route data 191A indicates a planned route 180A of the vehicle 104 from a first origin at a first time (e.g., expected time of departure) to a first destination at a second time (e.g., expected time of arrival). For example, the planned route 180A indicates that the vehicle 104 is expected to be at the first origin at the first time, a second location at a particular time, one or more additional locations at one or more additional times, the first destination at the second time, or a combination thereof. In a particular aspect, the device 102 receives the planned route data 191A prior to the vehicle 104 leaving the first origin.

In a particular aspect, the device 102 receives planned route data 191B via the network 190 from a data source 192A. The planned route data 191B indicates a planned route 180B of the vehicle 106 from a second origin at a first time (e.g., expected time of departure) to a second destination at a second time (e.g., expected time of arrival). For example, the planned route 180B indicates that the vehicle 106 is expected to be at the second origin at the first time, a second location at a particular time, one or more additional locations at one or more additional times, the second destination at the second time, or a combination thereof. The first origin may be the same as or different from the second origin or the second destination. The first destination may be the same as or different from the second origin or the second destination.

In a particular aspect, the route estimator 144 sends a planned route data request to the data source 192A and receives the planned route data 191B responsive to the planned route data request. In a particular implementation, the planned route data request indicates the planned route 180A of the vehicle 104, and the data source 192A sends planned route data 191 of the one or more vehicles 106 that are expected to be within a threshold distance of the vehicle 104 along the planned route 180A. For example, the data source 192A determines, based on a comparison of the planned route 180A and the planned route 180B, that a vehicle 106A is expected to be within a threshold distance of the vehicle 104. The data source 192A sends the planned route data 191B to the device 102 in response to determining that the vehicle 106A is expected to be within the threshold distance of the vehicle 104. In a particular implementation, the planned route data request indicates one or more regions associated with (e.g., passed through) the planned route 180A, and the data source 192A sends the planned route 180B in response to determining that the planned route 180B is associated with (e.g., passes through) at least one of the one or more regions.

In a particular aspect, the device 102 receives location data 193A of the vehicle 104 from the vehicle 104. The location data 193A indicates a particular location of the vehicle 104 detected at a particular time. In a particular implementation, the device 102 sends the planned route data request indicating the particular location and the particular time to the data source 192A, and the data source 192A sends planned route data 191 of the one or more vehicles 106 that are expected to be within a threshold distance of the particular location within a threshold time of the particular time.

In a particular aspect, the route estimator 144 determines a traversed route 182A of the vehicle 104 from a first location to the particular location. For example, the route estimator 144 at various time intervals receives the location data 193A from the vehicle 104. To illustrate, the route estimator 144 receives location data 193A at a first time indicating that the vehicle 104 is detected at the first location, location data 193A at a second time indicating that the vehicle 104 is detected at a second location, location data 193A at one or more additional times indicating that the vehicle 104 is detected at one or more additional locations, location data 193A at the particular time indicating that the vehicle 104 is detected (e.g., most recently detected) at the particular location, or a combination thereof. The route estimator 144 determines the traversed route 182A of the vehicle 104 from the first location, via the second location, the one or more additional locations, or a combination thereof, to the particular location. In a particular aspect, the traversed route 182A indicates points (and corresponding times) along a route traversed by the vehicle 104 from the first location to the particular location. In a particular implementation, the traversed route 182A includes straight route segments between pairs of detected locations of the vehicle 104. In an example, the traversed route 182 includes a curvilinear route that consists of a series of straight route segments that appear curvilinear at a particular scale. In a particular example, the first location includes the origin and the particular location is between the origin and the destination.

In a particular aspect, the device 102 receives location data 193 of the one or more vehicle 106 from a data source 192B. For example, the vehicle 106 at various time intervals (e.g., at 15-minute intervals) transmits vehicle location information of the vehicle 106 and the data source 192B stores the vehicle location information. To illustrate, the vehicle location information is received by a shore station that forwards the vehicle location information via a satellite to the data source 192B.

In a particular aspect, the route estimator 144 determines one or more traversed routes 182 of the one or more vehicles 106 based on the location data 193. For example, location data 193B indicates that a vehicle 106 is detected at a first location at a first time, one or more locations at one or more additional times, a particular location (e.g., a most recently detected location), at a particular time, or a combination thereof. The route estimator 144 determines a traversed route 182B of the vehicle 106 from the first location, via one or more additional locations, to the particular location. In a particular aspect, the traversed route 182B indicates points (and corresponding times) along a route traversed by the vehicle 106 from the first location to the particular location. In a particular implementation, the traversed route 182B includes straight route segments, curvilinear route segments, or a combination thereof, between pairs of detected locations of the vehicle 104.

In a particular aspect, the route estimator 144 determines one or more interpolated routes 184 of the one or more vehicles 106. For example, there may be a delay between the vehicle 106 transmitting the vehicle location information indicating the particular location (e.g., most recently detected location) of the vehicle 106 and the device 102 receiving the vehicle location information. The vehicle 106 may have moved from the particular location during the delay. For example, the VS data 159 (e.g., radar data, sonar data, or both) indicates an estimated location of the vehicle 106. In a particular aspect, the route estimator 144 determines an interpolated route 184 of the vehicle 106 in response to determining that a difference between the estimated location indicated by the VS data 159 and the particular location (e.g., most recently detected location) indicated by the location data 193 is greater than a threshold distance. In a particular aspect, determining the interpolated route 184 of the vehicle 106 includes performing an interpolation based on the particular location (e.g., most recently detected location) and the estimated location. In a particular aspect, the interpolated route 184 corresponds to a shortest traversable path, a fastest traversable path, or both, between the particular location and the estimated location. In some examples, the interpolated route 184 corresponds to a straight-line between the particular location and the estimated location. In other examples, the interpolated route 184 corresponds to a non-linear path between the particular location and the estimated location. To illustrate, the interpolated route 184 follows a curved path (e.g., a road or a river) that the vehicle 106 is traveling, avoids an obstacle (e.g., goes around an island, a mountain, or a building), follows legally accessible paths (e.g., avoids restricted areas, one way streets in the wrong direction, etc.), or a combination thereof.

In a particular aspect, the particular location indicated by the location data 193A of the vehicle 104 is the same as the estimated location indicated by the VS data 159 of the vehicle 104. For example, the device 102 receives the location data 193A, the VS data 159, or a combination thereof, from the vehicle 104. The location data 193A, the VS data 159, or a combination thereof, indicate the same vehicle location information (e.g., GPS coordinates) of the vehicle 104.

In a particular aspect, the route estimator 144 determines one or more forecasted routes 186 of the vehicle 104, one or more forecasted routes 186 of the one or more vehicles 106, or a combination thereof. For example, the route estimator 144 determines a forecasted route 186 from an estimated location to a forecasted location on a planned route. The forecasted route 186 is based on an estimated location (e.g., indicated by the VS data 159), a vehicle state (e.g., indicated by the VS data 159), a vehicle capability (e.g., indicated by vehicle capability data), external conditions (e.g., indicated by external conditions data), or a combination thereof. To illustrate, the route estimator 144 determines a forecasted route 186A of the vehicle 104 from an estimated location to a forecasted location on the planned route 180A of the vehicle 104. The forecasted route 186A is based on the estimated location of the vehicle 104, a vehicle state (e.g., a direction, a speed, acceleration, or a combination thereof) of the vehicle 104, a vehicle capability (e.g., average speed, maximum speed, turn radius, average acceleration, maximum acceleration, average deceleration, maximum deceleration) of the vehicle 104, external conditions (e.g., weather conditions, wind speed, wind currents, water currents, obstacles, restricted areas), or a combination thereof. In a particular aspect, the route estimator 144 determines the forecasted route 186A that the vehicle 104 is likely to take from the estimated location to get back to the planned route 180A given the vehicle state, the vehicle capability, the external conditions, or a combination thereof. In a particular aspect, the route estimator 144 receives the vehicle capability data, the external conditions data, or a combination thereof, from the one or more data sources 192, the vehicle 104, or a combination thereof.

In a particular aspect, the route estimator 144 determines a forecasted route 186B of a vehicle 106 from an estimated location to a forecasted location on a planned route 180B of the vehicle 106. The forecasted route 186B is based on the estimated location of the vehicle 106 (e.g., indicated by the VS data 159), a vehicle state (e.g., indicated by the VS data 159, such as a direction, a speed, acceleration, or a combination thereof) of the vehicle 106, a vehicle capability (e.g., indicated by vehicle capability data, such as average speed, maximum speed, turn radius, average acceleration, maximum acceleration, average deceleration, maximum deceleration) of the vehicle 106, the external conditions (e.g., indicated by the external conditions data, such as weather conditions, wind speed, wind currents, water currents, obstacles, restricted areas), or a combination thereof. In a particular aspect, the route estimator 144 determines the forecasted route 186B that the vehicle 106 is likely to take from the estimated location to get back to the planned route 180B given the vehicle state, the vehicle capability, the external conditions, or a combination thereof. In a particular aspect, the route estimator 144 receives the vehicle capability data, the external conditions data, or a combination thereof, from the one or more data sources 192, the vehicle 104, the vehicle 106, or a combination thereof.

In a particular aspect, the route estimator 144 determines one or more recommended routes 188 of the vehicle 104. For example, the route estimator 144 determines a recommended route 188 from an estimated location to a recommended location on a planned route. The recommended route 188 satisfies a route goal 194. For example, the route goal 194 includes obstacle avoidance, collision avoidance, bad weather avoidance, an area avoidance, a time goal, a fuel consumption goal, a cost goal, or a combination thereof. In a particular aspect, the route goal 194 is based on user input, default data, a configuration setting, or a combination thereof. In a particular aspect, the recommended route 188 is based on an estimated location (e.g., indicated by the VS data 159) of the vehicle 104, the vehicle state (e.g., indicated by the VS data 159) of the vehicle 104, a vehicle capability (e.g., indicated by the vehicle capability data) of the vehicle 104, the external conditions (e.g., indicated by the external conditions data), the one or more forecasted routes 186, the route goal 194, or a combination thereof. To illustrate, the route estimator 144 determines a recommended route 188A of the vehicle 104 from an estimated location to a recommended location on the planned route 180A of the vehicle 104. The recommended route 186A is based on the estimated location of the vehicle 104, the vehicle state (e.g., a direction, a speed, acceleration, or a combination thereof) of the vehicle 104, a vehicle capability (e.g., average speed, maximum speed, turn radius, average acceleration, maximum acceleration, average deceleration, maximum deceleration) of the vehicle 104, the external conditions (e.g., weather conditions, wind speed, wind currents, water currents, obstacles, restricted areas), the one or more forecasted routes 186 of the one or more vehicles 106, the route goal 194, or a combination thereof. In a particular aspect, the route estimator 144 determines the recommended route 188A of the vehicle 104 from the estimated location to get to the planned route 180A and satisfy the route goal 194 given the vehicle state, the vehicle capability, the external conditions, the routes that the one or more vehicles 106 are likely to take, or a combination thereof.

In a particular aspect, the route estimator 144, in response to determining that the forecasted route 186 fails to satisfy a route goal 194, generates a recommended route 188 that satisfies the route goal 194. The recommended route 188 indicates a recommended heading, a recommended speed, a recommended altitude, or a combination thereof, which is different from a forecasted heading, a forecasted speed, a forecasted altitude, or a combination thereof, indicated by the forecasted route 186.

In a particular example, the route estimator 144 detects a predicted collision between the vehicle 104 and the vehicle 106 based on a comparison of the forecasted route 186A of the vehicle 104 and a forecasted route 186B of the vehicle 106. To illustrate, the route estimator 144 detects the predicted collision in response to determining that a first forecasted location of the vehicle 104 at a first forecasted time indicated by the forecasted route 186A is within a threshold distance of a second forecasted location of the vehicle 106 at a second forecasted time indicated by the forecasted route 186B, and that the first forecasted time is within a threshold duration of the second forecasted time. The route estimator 144, in response to determining that the route goal 194 includes collision avoidance and detecting the predicted collision, generates a recommended route 188A of the vehicle 104 that avoids the predicted collision, generates an alert 181 indicating the predicted collision and the recommended route 188A, or both. For example, the recommended route 188A includes a recommended speed, a recommended direction, a recommended altitude, or a combination thereof, that is different from a forecasted speed, a forecasted direction, a forecasted altitude, or a combination thereof, indicated by the forecasted route 186A, prior to a predicted location of the predicted collision.

In a particular aspect, the route estimator 144 determines multiple recommended routes 188 of the vehicle 104. For example, the route estimator 144 determines the recommended route 188A that satisfies a route goal 194A (e.g., collision avoidance), a recommended route 188B that satisfies a route goal 194B (e.g., a time goal), a recommended route 188C that satisfies a route goal 194C (e.g., collision avoidance and a cost goal), or a combination thereof. In a particular aspect, the route estimator 144 stores data indicating the one or more routes 178, the route goal 194, the alert 181, the planned route data 191, the location data 193, or a combination thereof, in the memory 132.

The context estimator 152 retrieves the HS data 141 corresponding to the first time range (e.g., 10:10 AM-10:11 AM) from the memory 132. For example, the HS data 141 includes sensor data that is timestamped with a time (e.g., 10:10:03 AM) during the first time range. The context estimator 152 retrieves the VS data 159 corresponding to the second time range (e.g., 10:09 AM-10:11 AM) from the memory 132. For example, the VS data 159 includes sensor data that is timestamped with a time (e.g., 10:10:07 AM) during the second time range. The context estimator 152, in response to determining that the first time range matches (e.g., overlaps) the second time range, determines that the HS data 141 corresponds to the VS data 159. In a particular example, the context estimator 152 determines that the first time range matches the second time range in response to determining that the first time range is the same as the second time range. In another example, the context estimator 152 determines that the first time range matches the second time range in response to determining that the first time range overlaps the second time range. In a particular example, the context estimator 152 determines that the first time range matches the second time range in response to determining that a duration between an end of one of the first time range or the second time range and a beginning of the other of the first time range or the second time range is within a threshold duration (e.g., 10 seconds or 1 minute).

The context estimator 152 determines a context 137 based on the HS data 141, the VS data 159, or both. For example, the context estimator 152, in response to determining that the HS data 141 corresponds to the VS data 159, determines the context 137 based on the HS data 141 and the VS data 159. In a particular aspect, the context estimator 152 determines a user location context 121 indicating whether or not the user 101 is in any vehicle. In a particular implementation, the context estimator 152, in response to determining that the VS data 159 indicates that a tag associated with the user 101 is detected in proximity (e.g., less than 6 inches) of a first sensor that is in the vehicle 104, generates the user location context 121 indicating that the user 101 is in the vehicle 104. Alternatively, the context estimator 152, in response to determining that the VS data 159 indicates that a tag associated with the user 101 is detected in proximity (e.g., less than 6 inches) of a second sensor that is outside (e.g., on an external surface of) the vehicle 104, generates the user location context 121 indicating that the user 101 is not in the vehicle 104. In an alternative implementation, the context estimator 152 generates the user location context 121 indicating that the user 101 is in the vehicle 104 in response to determining that a first user location of the user 101 indicated by the HS data 141 is within a threshold distance (e.g., 6 inches) of a first vehicle location of the vehicle 104 indicated by the VS data 159, that image recognition performed on image sensor data of the HS data 141 matches an interior of the vehicle 104, or both.

In a particular aspect, a user 101 is considered to be "in" the vehicle 104 when a movement of the vehicle 104 is likely to cause a movement of the AR headset 108 worn by the user 101 independently of any movement caused by the user 101. In a particular example, the user 101 is standing on the roof of the vehicle 104 and is considered to be "in" the vehicle 104. In another example, the user 101 is standing with feet on the ground outside the vehicle 104 and with a head through an open window looking inside the vehicle 104 and the user 101 is considered to not be "in" the vehicle 104.

The context estimator 152 determines a user role 139 of the user 101. In a particular example, the user role 139 is relatively static and is indicated by context configuration data 167. In a particular aspect, the context configuration data 167 is based on default data, configuration data, user input, or a combination thereof. In an alternative example, the user role 139 is dynamic and is based at least in part on the user location context 121. To illustrate, the context configuration data 167 indicates that the user 101 has a first role inside the vehicle 104 and a second role outside the vehicle 104.

The user movement estimator 140, in response to determining that the user location context 121 indicates that the user 101 is in the vehicle 104, determines a user movement 111 based on a comparison of the HS data 141 and the VS data 159. In a particular example, the user movement estimator 140 determines a headset movement 109 indicated by the HS data 141. For example, the HS data 141 indicates that the AR headset 108 moved in a particular direction, a particular distance, a particular angle of rotation, or a combination thereof, relative to an environment (e.g., geographic coordinates). The headset movement 109 indicates the particular direction, the particular distance, the particular angle of rotation, or a combination thereof. In a particular aspect, the particular angle of rotation indicates yaw, pitch, roll, or a combination thereof, of a head of the user 101 relative to the environment. The user movement estimator 140 determines a vehicle movement 105 indicated by the VS data 159. For example, the VS data 159 indicates that the vehicle 104 moved in a particular direction, a particular distance, a particular angle of rotation, or a combination thereof, relative to an environment (e.g., geographic coordinates). In a particular aspect, the particular angle of rotation indicates yaw, pitch, roll, or a combination thereof, of the vehicle 104 relative to the environment. The vehicle movement 105 indicates the particular direction, the particular distance, the particular angle of rotation, or a combination thereof.

The user movement estimator 140, in response to determining that the user location context 121 indicates that the user 101 is in the vehicle 104, determines the user movement 111 based on a comparison of the headset movement 109 and the vehicle movement 105. For example, the user movement estimator 140 determines the user movement 111 based on a net of the headset movement 109 and the vehicle movement 105. In a particular aspect, the headset movement 109 includes a first portion caused by a movement of the user 101 and a second portion caused by a movement of the vehicle 104. For example, the user 101 wearing the AR headset 108 moves their head (e.g., turns 5 degrees to the left) and the vehicle 104 turns (e.g., 90 degrees to the left). The headset movement 109 indicates that the AR headset 108 moved (e.g., 95 degrees) relative to the environment. The user movement 111 (e.g., 5 degrees to the left) indicates the first portion (e.g., caused by movement of a head of the user 101 and not caused by the vehicle movement 105).

In a particular aspect, the user movement estimator 140, in response to determining that the user location context 121 indicates that the user 101 is not in the vehicle 104 (e.g., is not in any vehicle), determines the user movement 111 based on the HS data 141 and independently of the VS data 159. For example, the user movement estimator 140, in response to determining that the user location context 121 indicates that the user 101 is not in the vehicle 104 (e.g., is not in any vehicle) designates the headset movement 109 as the user movement 111.

The user movement estimator 140, in response to determining that the user location context 121 indicates that the user 101 is in the vehicle 104, determines a headset orientation 115 and a headset location 113, of the AR headset 108 relative to the vehicle 104. For example, the user movement estimator 140 determines the headset orientation 115, the headset location 113, or both, based on the user movement 111. In a particular example, the user movement 111 indicates a particular angle of rotation (e.g., a net angle of rotation) relative to the vehicle 104 and the user movement estimator 140 determines the headset orientation 115 based on the particular angle of rotation. To illustrate, the user movement estimator 140, in response to determining that the AR headset 108 previously had a first headset orientation relative to (e.g., the user 101 was looking towards a front of) the vehicle 104, determines the headset orientation 115 (e.g., −5 degrees or 355 degrees) by applying the particular angle of rotation (e.g., 5 degrees to the left) to the first headset orientation (e.g., 0 degrees). In a particular example, the user movement 111 indicates a particular distance, a particular direction, or both, relative to the vehicle 104, and the user movement estimator 140 determines the headset location 113 based on the particular distance, the particular direction, or both. To illustrate, the user movement estimator 140, in response to determining that the AR headset 108 previously had a first headset location (e.g., first coordinates) relative to the vehicle 104, determines the headset location 113 (e.g., second coordinates) relative to the vehicle 104 by applying the particular distance, the particular direction, or both (e.g., coordinates delta), to the first headset location (e.g., first coordinates). The user movement estimator 140 stores the headset location 113, the headset orientation 115, or both, in the memory 132.

In a particular example, the HS data 141 indicates that the user 101 is looking in a first global direction (e.g., West) and the VS data 159 indicates that the vehicle 104 is oriented in a second global direction (e.g., North). The user movement estimator 140 determines, based on a comparison of the first global direction and the second global direction, that the user 101 is looking in a particular user-vehicle direction relative to (e.g., towards the left side of) the vehicle 104. The headset orientation 115 indicates the particular user-vehicle direction.

In a particular example, the HS data 141 indicates that the user 101 is located at a first global location and the VS data 159 indicates that a center of the vehicle 104 is located at a second global location. The user movement estimator 140 determines, based on a comparison of the first global location and the second global location, that the user 101 is located at a particular user-vehicle location relative to the center of the vehicle 104. The headset location 113 indicates the particular user-vehicle location.

The gaze target estimator 142, in response to determining that the user location context 121 indicates that the user 101 is not in the vehicle 104, determines a gaze target 127 based on the HS data 141, the user movement 111, or both. In a particular example, the HS data 141 indicates a global location (e.g., GPS coordinates) of the user 101, a global direction (e.g., a compass direction, an elevation angle, or both) that the user 101 is looking at, or both. In another example, the HS data 141 indicates the user movement 111. In this example, the gaze target estimator 142 determines the global location, the global direction, or both, by applying the user movement 111 to a previous global location, a previous global direction, or both, of the user 101. In a particular aspect, the gaze target estimator 142 identifies the gaze target 127 in response to determining that map data 135 indicates that the gaze target 127 is associated with the global location, the global direction, or both. In a particular aspect, the gaze target estimator 142 performs image recognition by comparing image sensor data of the HS data 141 with images of objects associated with the global location, global direction, or both. In this aspect, the gaze target estimator 142 identifies the gaze target 127 in response to determining, based on the image recognition, that an image of the gaze target 127 matches the image sensor data.

In a particular aspect, the gaze target estimator 142, in response to determining that the user location context 121 indicates that the user 101 is in the vehicle 104, determines the gaze target 127 based on the HS data 141, the headset location 113, the headset orientation 115, or a combination thereof. In a particular example, the gaze target 127 indicates what (e.g., an object) the user 101 is looking at. The gaze target estimator 142 performs image recognition on image sensor data of the HS data 141 (e.g., captured by a camera of the headset sensor 131) to identify a particular object. To illustrate, the gaze target estimator 142 determines vehicle map data 133 indicates that a gaze target area (e.g., a particular instrument panel) corresponds to the headset location 113, the headset orientation 115, or both. The vehicle map data 133 includes images of objects (e.g., particular instruments) located in the gaze target area (e.g., the particular instrument panel) in the vehicle 104. For example, the vehicle map data 133 includes one or more first images of a particular object. The gaze target estimator 142 identifies the particular object as the gaze target 127 in response to determining that image recognition indicates that the image sensor data matches the first images. The gaze target estimator 142, in response to determining that the vehicle map data 133 indicates that the particular object is in the vehicle 104, generates a gaze target context 123 indicating that the gaze target 127 is in the vehicle 104.

In a particular example, the gaze target estimator 142 determines that the user 101 is looking at a particular object that is outside the vehicle 104. To illustrate, that the gaze target estimator 142, in response to determining that the vehicle map data 133 indicates that the headset location 113, the headset orientation 115, or both, correspond to an open or see-through portion (e.g., a window) of the vehicle 104, that the user 101 is looking outside. In a particular example, the gaze target estimator 142 identifies a particular object (that is outside the vehicle 104) as the gaze target 127 by performing image recognition. In a particular example, the gaze target estimator 142 identifies the particular object outside the vehicle 104 based on a global location (e.g., geographic coordinates) and a global direction (e.g., East) of the user 101. For example, the gaze target estimator 142, based on map data 135, identifies a global area (e.g., a section on the left side of a particular road) based on the global location and the global direction. The gaze target estimator 142 designates the particular object as the gaze target 127 in response to determining, based on image recognition, that image sensor data of the HS data 141 matches images of the particular object. The gaze target estimator 142 generates the gaze target context 123 indicating that the gaze target 127 is outside the vehicle 104. In a particular aspect, the gaze target context 123 indicates a location (e.g., GPS coordinates) of the gaze target 127.

The visualization data generator 154 generates visualization data 155 based on the HS data 141, the gaze target 127, the context 137, the context configuration data 167, the one or more routes 178, the alert 181, or a combination thereof. For example, the context configuration data 167 indicates data corresponding to the gaze target 127, the context 137, or both. In a particular example, the context configuration data 167 indicates that first data (e.g., a three-dimensional map with locations of the one or more vehicles 106, a location of the vehicle 104, the routes 178, or a combination thereof) corresponds to the user role 139 (e.g., a navigator), the user location context 121 (e.g., inside the vehicle 104), the gaze target 127 (e.g., an interior portion of the vehicle 104), the gaze target context 123 (e.g., inside the vehicle 104), or a combination thereof. In a particular aspect, a first portion of the first data is relatively static (e.g., locations of landmarks in the three-dimensional map) and a second portion of the first data is dynamic (e.g., locations and routes). For example, the second portion of the first data is received from one or more systems (e.g., a radar system, a communication system, or both) of the vehicle 104, generated by the route estimator 144, or a combination thereof.

The visualization data generator 154 generates the visualization data 155 to include one or more visual elements 163 based on the first data. For example, the visualization data generator 154, in response to determining that the gaze target context 123 indicates that the gaze target 127 is inside the vehicle 104, generates the visualization data 155 to include the visual elements 163 that are to be displayed to users in the vehicle 104 having the user role 139 (e.g., navigator) and looking in a direction of the particular object (e.g., the particular instrument) of the vehicle 104.

In a particular aspect, the visual elements 163 include a first visual depiction (e.g., a virtual representation) of a point of interest (POI) 164 (e.g., a vehicle 106) that is located outside the vehicle 104, a second visual indicator indicating a location of a POI 166 (e.g., the particular instrument) that is located inside the vehicle 104, a visual depiction of the alert 181, or a combination thereof. As used herein, "POI" refers to an object, a landmark, a location, a person, a vehicle, at least a portion of a route of a vehicle, data, or a combination thereof, that is to be indicated in the visualization data 155. In a particular example, the context configuration data 167 indicates the objects, the landmarks, the locations, the persons, the vehicles, the route portions, or a combination thereof, that are POIs.

Figure 2B:
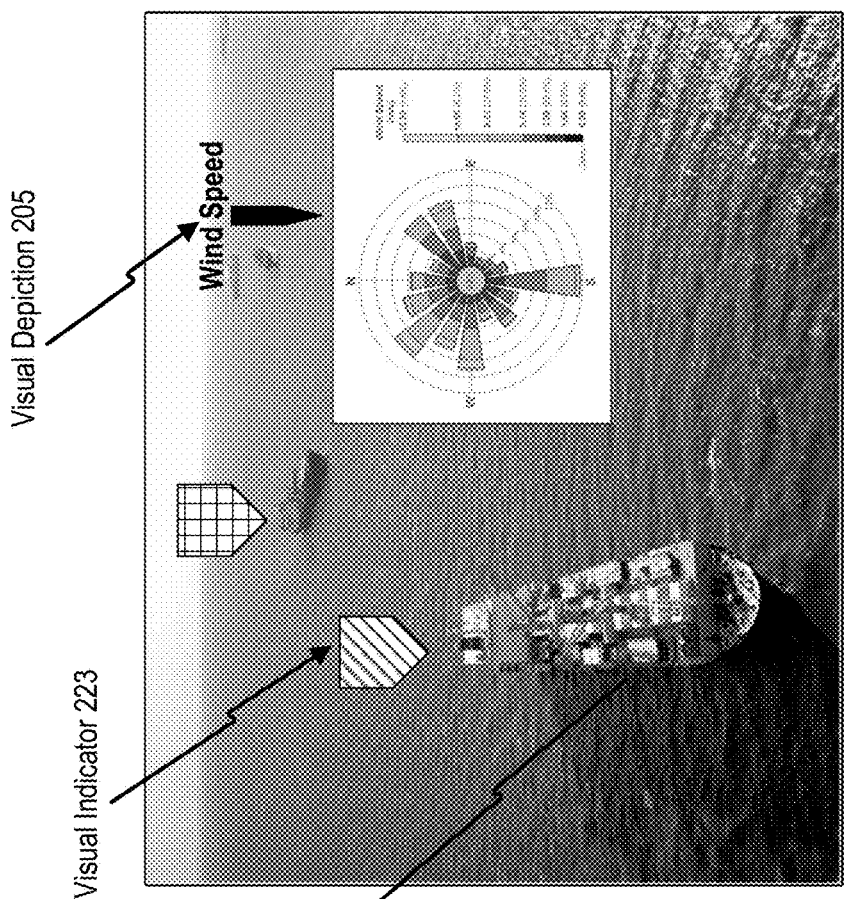
FIG. 2B is a diagram that illustrates another example of augmented reality visualization.
Figure 2A:
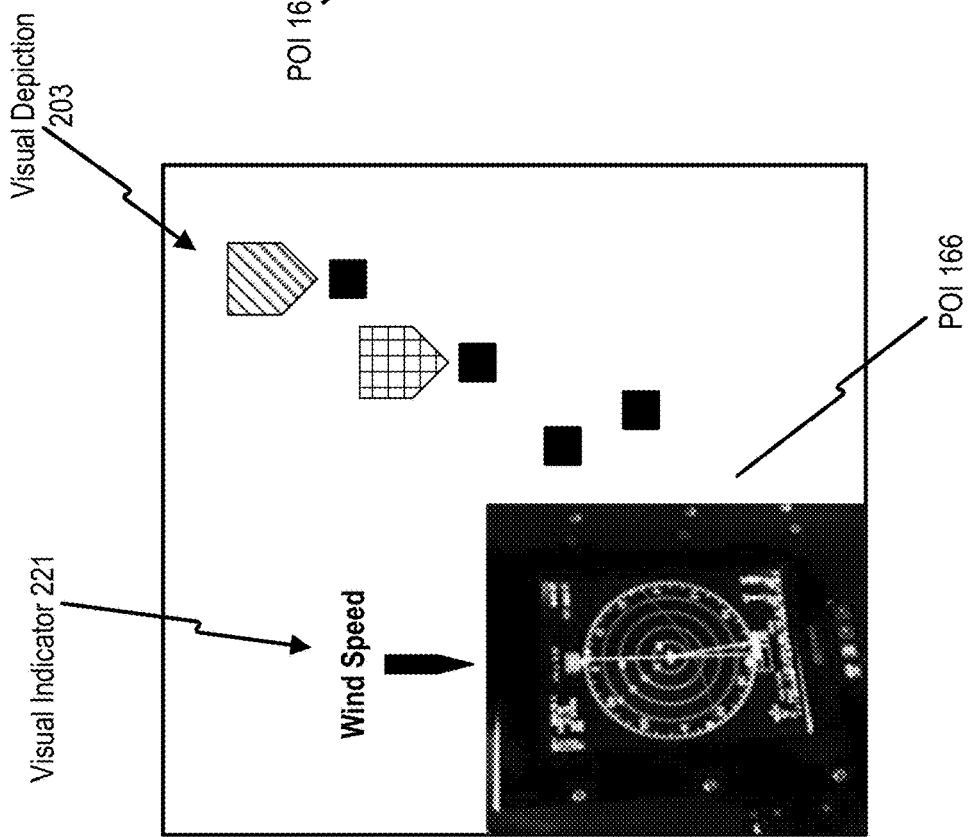
FIG. 2A is a diagram that illustrates an example of augmented reality visualization.

In the example illustrated in FIG. 2A, the visual elements 163 include a visual depiction 203 (e.g., a virtual representation) of the POI 164 (e.g., a vehicle 106) that is outside the vehicle 104, a visual indicator 221 that indicates a location of the POI 166 (e.g., a particular instrument) that is inside the vehicle 104, or both. The visual depiction 203, the visual indicator 221, or both, include one or more visual elements. In a particular aspect, a visual element includes a symbol, a shape, a fill, a label, an image, an animation, a video, text, a pattern, or a combination thereof. In a particular aspect, a visual element indicates information (e.g., an identifier, specifications, remaining fuel, passenger information, cargo information, location, or a combination thereof) of a corresponding POI (e.g., the POI 164 or the POI 166). In a particular aspect, a visual element includes a selectable option associated with the corresponding POI (e.g., the POI 164 or the POI 166). For example, the user 101 can select a selectable option associated with the POI 164, e.g., to communicate with the vehicle 106.

In a particular aspect, the visual depiction 203 is generated for display inside the vehicle 104 of a virtual representation of the POI 164 (e.g., the vehicle 106) that is outside the vehicle 104. In a particular aspect, the visual elements 163 include visual depictions of multiple POIs outside the vehicle 104 and the visual elements 163 are generated to display, inside the vehicle 104, relative locations of the multiple POIs. For example, the visual depiction 203 of the POI 164 (e.g., the vehicle 106) is generated to be displayed twice as far inside the vehicle 104 from a first visual depiction of a first POI (e.g., the vehicle 106) than from a second visual depiction of a second POI (e.g., a hill) if the POI 164 is twice as far from the first POI than from the second POI outside the vehicle 104.

In a particular aspect, the visual indicator 221 is generated for display by the AR headset 108 to indicate a location of the POI 166 (e.g., the particular instrument) within the vehicle 104 when the POI 166 is in a field of view of the user 101 wearing the AR headset 108. For example, the visualization data generator 154 determines, based on the vehicle map data 133, the HS data 141, or both, the location of the POI 166 inside the vehicle 104. To illustrate, the visualization data generator 154 performs image recognition on image sensor data of the HS data 141 and determines a location of the POI 166 in a field of view of the user 101 of the AR headset 108. The visualization data generator 154 generates the visual indicator 221 such that the visual indicator 221 indicates the location of the POI 166 in the field of view of the user 101. For example, the visual indicator 221 is overlaid proximate to (e.g., within an inch of) the POI 166 in the field of view of the user 101.

Figure 3B:
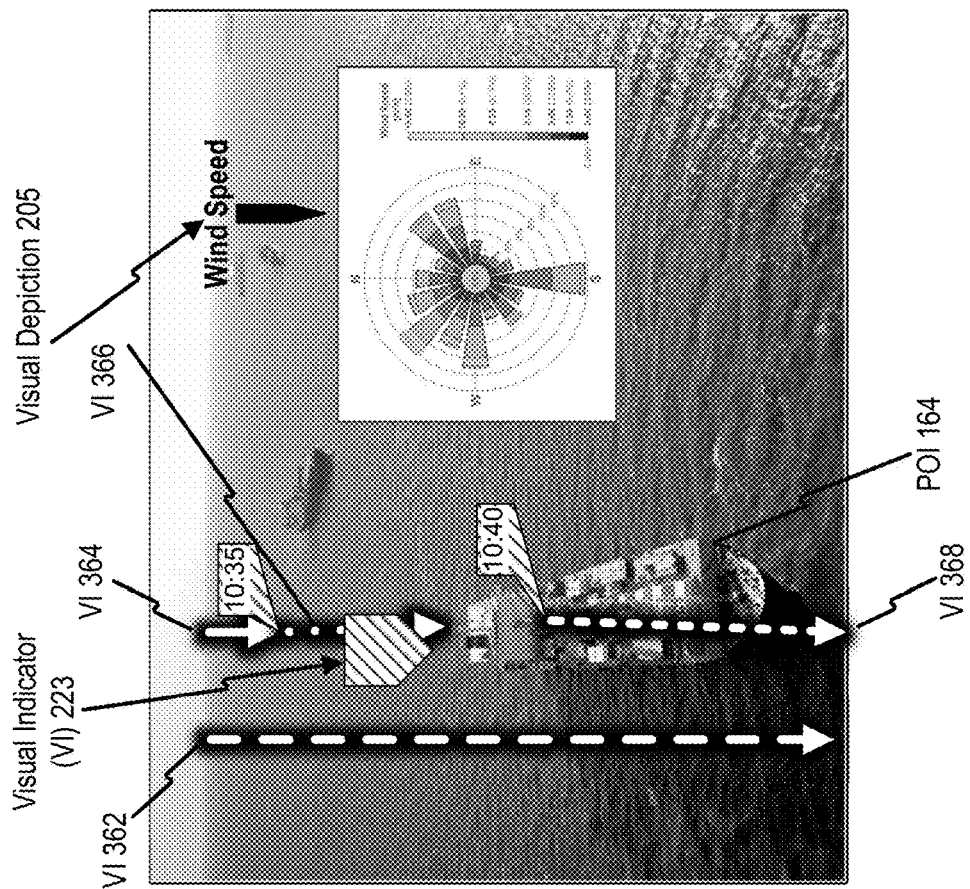
FIG. 3B is a diagram that illustrates another example of augmented reality visualization.
Figure 3A:
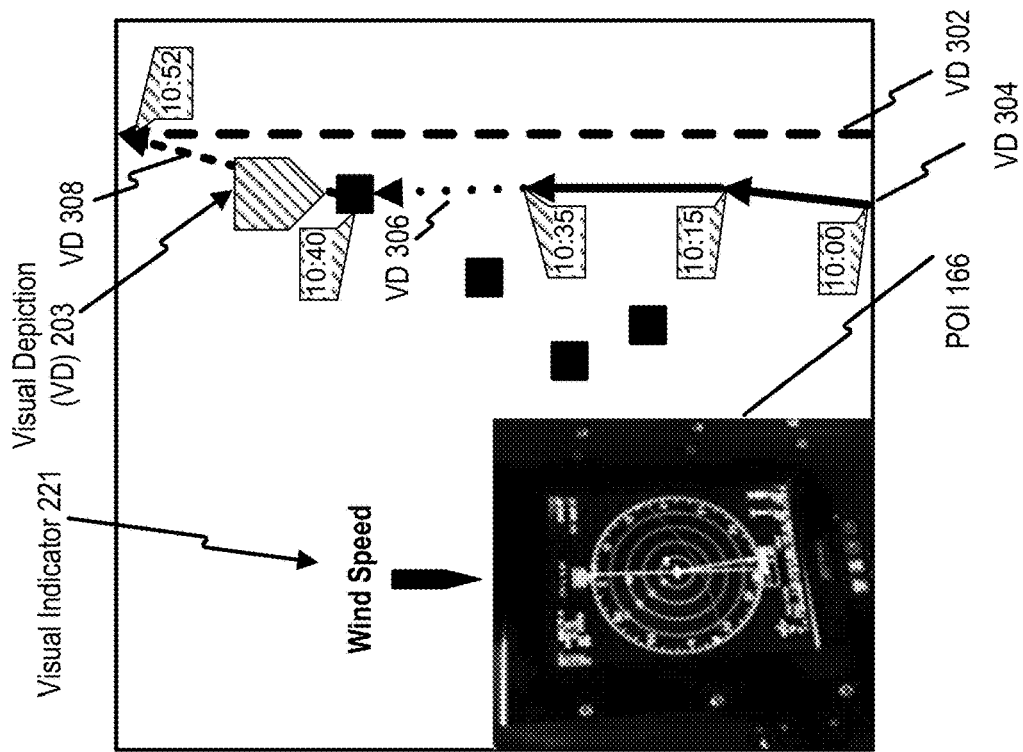
FIG. 3A is a diagram that illustrates another example of augmented reality visualization.

In the example illustrated in FIG. 3A, the visual elements 163 include one or more visual depictions of one or more POIs (e.g., one or more portions of one or more routes of the vehicle 106) that are outside the vehicle 104. For example, the visual elements 163 include a visual depiction 302 (e.g., a virtual representation) of a first POI (e.g., one or more portions of the planned route 180B), a visual depiction 304 of a second POI (e.g., one or more portions of the traversed route 182B), a visual depiction 306 of a third POI (e.g., one or more portions of the interpolated route 184B), a visual depiction 308 of a fourth POI (e.g., one or more portions of the forecasted route 186B), or a combination thereof.

The visual depictions 302, 304, 306, and 308 include one or more visual elements. In a particular aspect, a visual element includes a symbol, a shape, a fill, a label, an image, an animation, a video, text, or a combination thereof. In a particular aspect, a visual element indicates information (e.g., an identifier, remaining fuel, a location, a time, or a combination thereof) of a corresponding POI (e.g., a portion of a route). For example, the visual element includes a time of a location (e.g., a planned location, a traversed location, an interpolated location, or a forecasted location) of the vehicle 106 along a corresponding route (e.g., the planned route 180B, the traversed route 182B, the interpolated route 184B, or the forecasted route 186B). In a particular aspect, a visual element includes a selectable option associated with the corresponding POI (e.g., the portion of route). For example, the user 101 can select a selectable option associated with the indicated route, e.g., to communicate with the vehicle 106. In a particular aspect, the visual depictions 302, 304, 306, and 308 include at least one common element (e.g., the same arrowhead) to indicate that the visual depictions 302, 304, 306, and 308 are related (e.g., to the vehicle 106). In a particular aspect, the visual depictions 302, 304, 306, and 308 include at least one different element (e.g., the line dash type) to indicate that the visual depictions 302, 304, 306, and 308 correspond to portions of different types of routes (e.g., planned, traversed, interpolated, or forecasted).

Figures 4A, 4B:
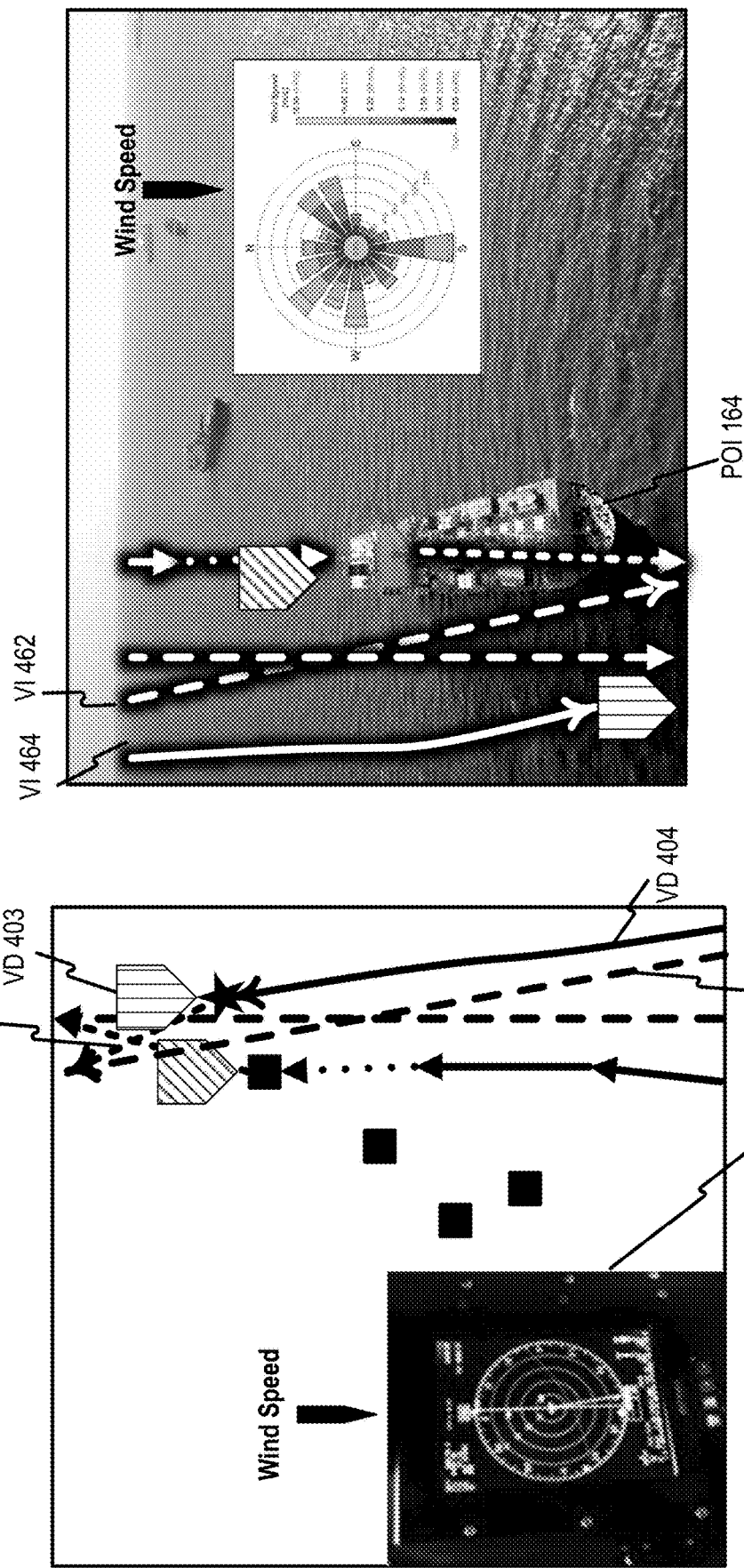
FIG. 4A is a diagram that illustrates another example of augmented reality visualization.
FIG. 4B is a diagram that illustrates another example of augmented reality visualization.

In the example illustrated in FIG. 4A, the visual elements 163 include a visual depiction 403 (e.g., a virtual representation) of a POI (e.g., the vehicle 104) and one or more visual depictions of one or more POIs (e.g., one or more portions of one or more routes of the vehicle 104) that are outside the vehicle 104. For example, the visual elements 163 include a visual depiction 402 (e.g., a virtual representation) of a first POI (e.g., one or more portions of the planned route 180A), a visual depiction 404 of a second POI (e.g., one or more portions of the traversed route 182A), a visual depiction 408 of a third POI (e.g., one or more portions of the forecasted route 186A), or a combination thereof.

The visual depictions 402, 403, 404, and 408 include one or more visual elements. In a particular aspect, a visual element indicates information (e.g., an identifier, remaining fuel, a location, a time, or a combination thereof) of a corresponding POI (e.g., the vehicle 104 or a portion of a route). In a particular aspect, a visual element includes a selectable option associated with the corresponding POI (e.g., the portion of route, the vehicle 104, or both). For example, the user 101 can select a selectable option associated with the forecasted route 186A (e.g., the indicated route) to set course of the vehicle 104 to the forecasted route 186A. In a particular aspect, the visual depictions 402, 404, and 408 include at least one common element (e.g., the same arrowhead) to indicate that the visual depictions 402, 404, and 408 are related (e.g., to the vehicle 104). In a particular aspect, at least one common element of the visual depictions 402, 404, and 408 is different from at least one common element of the visual depictions 302, 304, 306, and 308. In a particular aspect, the visual depiction 302 and the visual depiction 402 include at least a first common element (e.g., a first line dash type) to indicate a common route type (e.g., a planned route), the visual depiction 304 and the visual depiction 404 include at least a second common element (e.g., a second line dash type) to indicate a common route type (e.g., a traversed route), the visual depiction 308 and the visual depiction 408 include at least a third common element (e.g., a third line dash type) to indicate a common route type (e.g., a forecasted route), or a combination thereof.

Figures 5A, 5B:
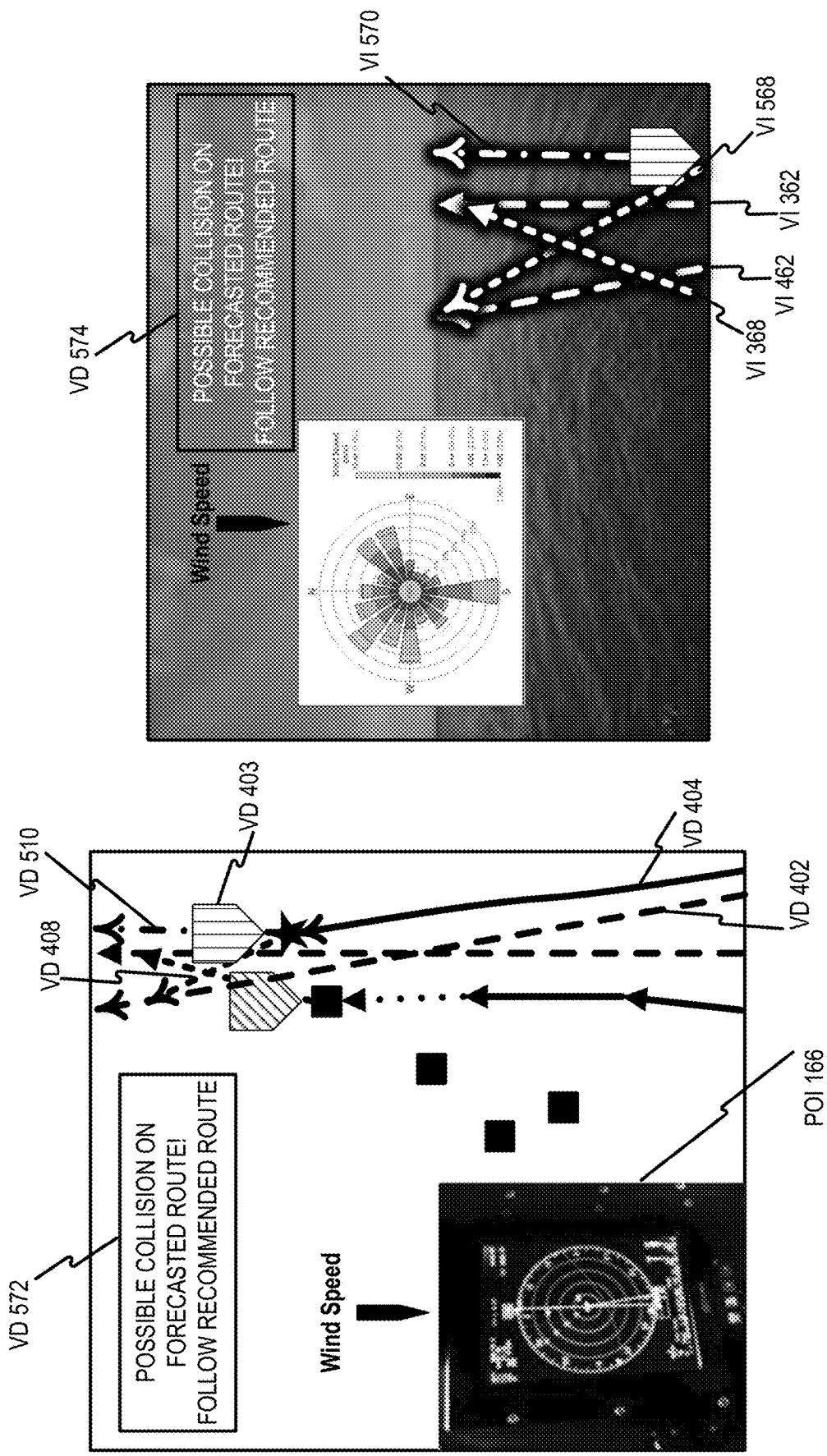
FIG. 5A is a diagram that illustrates another example of augmented reality visualization.
FIG. 5B is a diagram that illustrates another example of augmented reality visualization.

In the example illustrated in FIG. 5A, the visual elements 163 include a visual depiction 510 (e.g., a virtual representation) of a POI (e.g., one or more portions of the recommended route 188A), a visual depiction 572 of the alert 181, or both. In a particular aspect, the visual elements 163 include multiple depictions of multiple recommended routes.

The visual depiction 510 includes one or more visual elements. In a particular aspect, a visual element includes a selectable option associated with the corresponding POI (e.g., the portion of route, the vehicle 104, or both). For example, the user 101 can select a selectable option associated with the recommended route 188A (e.g., the indicated route) to set course of the vehicle 104 to the recommended route 188A. In a particular aspect, the visual depiction 510 includes at least one common element (e.g., the same arrowhead) of the visual depictions 402, 404, and 408 to indicate that the visual depictions 402, 404, 408, and 510 are related (e.g., to the vehicle 104). In a particular aspect, at least one common element of the visual depictions 402, 404, 408, and 510 is different from at least one common element of the visual depictions 302, 304, 306, and 308.

Returning to FIG. 1, the visualization data generator 154, in response to determining that the gaze target 127 is outside the vehicle 104, generates the visualization data 155 to include the visual elements 163 that are to be displayed to users in the vehicle 104 having the user role 139 (e.g., navigator) and looking in a direction of the particular object (e.g., the vehicle 106) outside the vehicle 104. In a particular aspect, the visual elements 163 include a first visual indicator indicating a location of the POI 166 (e.g., the vehicle 106) that is located outside the vehicle 104, a second visual depiction of the POI 166 (e.g., the particular instrument) that is located inside the vehicle 104, a visual depiction of the alert 181, or a combination thereof.

In the example illustrated in FIG. 2B, the visual elements 163 include a visual depiction 205 of the POI 166 (e.g., the particular instrument) that is inside the vehicle 104, a visual indicator 223 that indicates a location of the POI 164 (e.g., the vehicle 106) that is outside the vehicle 104, or both. The visual depiction 205, the visual indicator 223, or both, include one or more visual elements.

In the example illustrated in FIG. 3B, the visual elements 163 include a visual indicator 362 that indicates a location of a first POI (e.g., one or more portions of the planned route 180B), a visual indicator 364 that indicates a location of a second POI (e.g., one or more portions of the traversed route 182B), a visual indicator 366 that indicates a location of a third POI (e.g., one or more portions of the interpolated route 184B), and a visual indicator 368 that indicates a location of a fourth POI (e.g., one or more portions of the forecasted route 186B). The visual indicator 362, the visual indicator 364, the visual indicator 366, the visual indicator 368, or a combination thereof, include one or more visual elements.

In the example illustrated in FIG. 4B, the visual elements 163 include a visual indicator 462 that indicates a location of a first POI (e.g., one or more portions of the planned route 180A) and a visual indicator 464 that indicates a location of a second POI (e.g., one or more portions of the traversed route 182A). The visual indicator 462, the visual indicator 464, or both, include one or more visual elements. In a particular aspect, the visual elements 163 include visual indicators corresponding to one or more portions of routes that are within a field of view of the user 101. In the example illustrated in FIG. 4B, portions of the planned route 180A and portions of the traversed route 182A are within a field of view of the user 101 and the forecasted route 186A is not within a field of view of the user 101.

In the example illustrated in FIG. 5B, the visual elements 163 include a visual depiction 574 of the alert 181, a visual indicator 568 that indicates a location of a first POI (e.g., one or more portions of the forecasted route 186A) and a visual indicator 570 that indicates a location of a second POI (e.g., one or more portions of the recommended route 188A). The visual depiction 574, visual indicator 568, the visual indicator 570, or a combination thereof, include one or more visual elements. In the example illustrated in FIG. 5B, portions of the forecasted route 186A and portions of the recommended route 188A are within a field of view of the user 101, and the planned route 180A and the traversed route 182A are not within a field of view of the user 101. In a particular aspect, the visual elements 163 include visual indicators of portions of multiple recommend routes 188 that are within a field of view of the user 101.

In a particular implementation, the visualization data generator 154 generates the visualization data 155 to reduce a mental workload of the user 101 in transitioning between an output of the AR headset 108 corresponding to the inside of the vehicle 104 and an output of the AR headset 108 corresponding to the outside of the vehicle 104. For example, the visual depiction 203 includes at least one visual element in common with the visual indicator 223. In the example of FIGS. 2A-2B, the common visual elements include a shape and a fill (e.g., a diagonal fill). As another example, the visual depiction 205 includes at least one visual element in common with the visual indicator 221. In the example of FIGS. 2A-2B, the common visual elements include a shape and text (e.g., Wind Speed). In a particular example, the visual depiction 302 includes at least one visual element in common with the visual indicator 362. In the example of FIGS. 3A-3B, the common visual elements include an arrowhead and a dashed line type. The common visual elements reduce a mental workload of the user 101 in identifying visual depictions and corresponding visual indicators as the user 101 transitions between looking at a gaze target that is inside the vehicle 104 and a gaze target that is outside the vehicle 104.

The visualization data generator 154 sends the visualization data 155 to a display of the AR headset 108. The AR headset 108 generates, based on the visualization data 155, an AR output indicating the visual elements 163. In a particular aspect, the AR output can be manipulated based on user input. For example, the user 101 can rotate, zoom into, or zoom out of a three-dimensional map. In an illustrative example, the three-dimensional map includes visual depictions of moving objects in low-visibility terrain and the user 101 (e.g., a navigator) can use the three-dimensional map to account for the moving objects and plan a path for the vehicle 104 through the terrain.

The system 100 thus enables determining a user portion of a movement of an AR headset that is caused by a movement of a head of a user of the AR headset and not caused by a movement of a vehicle that the user is in. The system 100 also enables visualization data to include visual elements that are selected based on context. The visual elements can be displayed in a field of view of the user, enabling the user to access relevant information without having to transition between contexts and without having to have access to fixed displays. When the user does transition between contexts, a mental workload associated with the transition is reduced.

Figure 6:
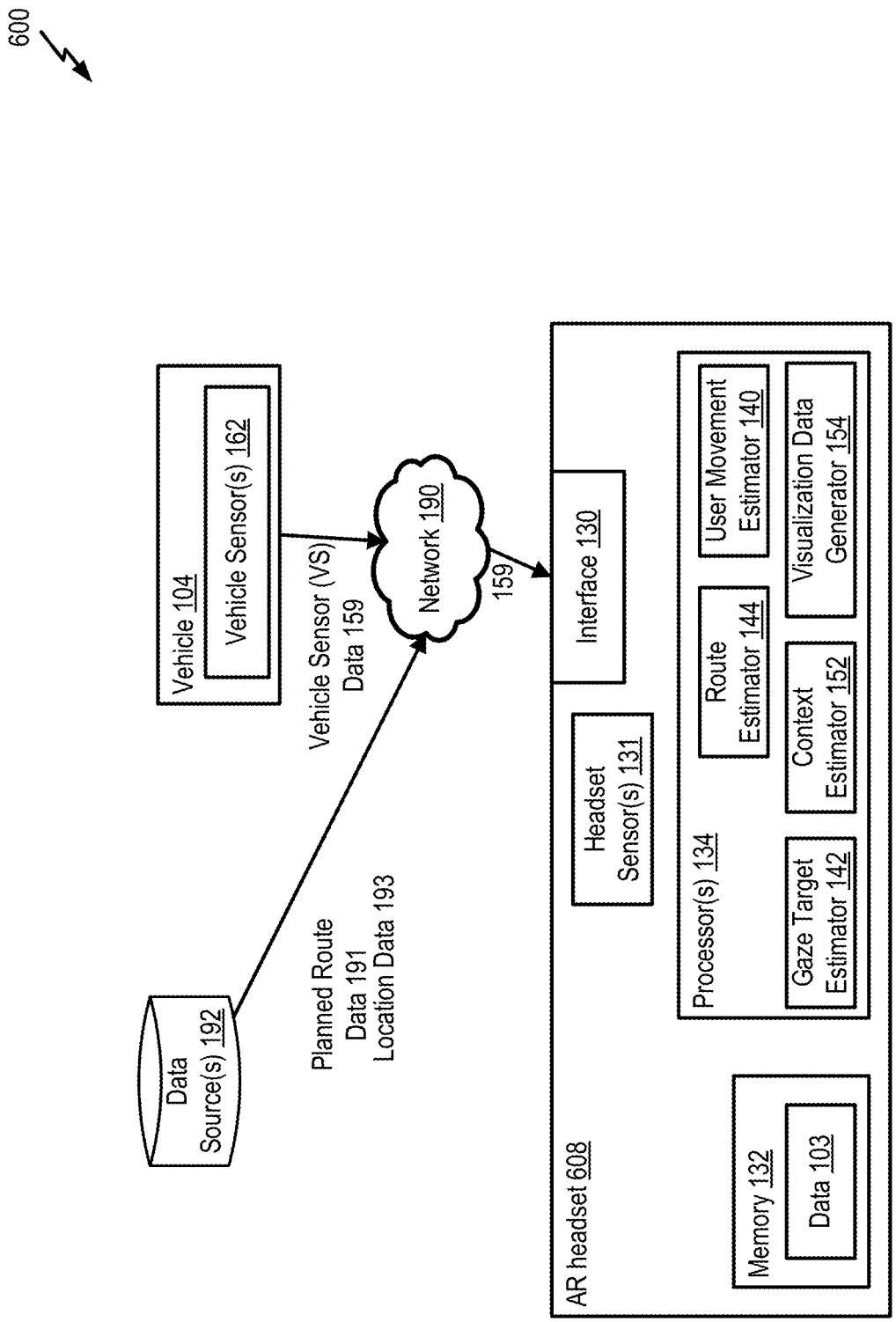
FIG. 6 is a diagram that illustrates an example of another system operable to perform augmented reality visualization.

Referring to FIG. 6, a system operable to perform augmented reality visualization is shown and generally designated 600. In the system 600, the processor 134 is integrated in an AR headset 608. For example, the visualization data generator 154 generates the visualization data 155 based at least in part on the HS data 141 generated by the AR headset 608 (e.g., the headset sensor 131), the VS data 159 received from the vehicle 104 (e.g., the vehicle sensor 162), the planned route data 191, the location data 193, or a combination thereof, as described with reference to FIG. 1.

Integrating one or more of the user movement estimator 140, the gaze target estimator 142, the route estimator 144, the context estimator 152, or the visualization data generator 154 in the AR headset 608 reduces a number of devices used for augmented reality visualization as compared to the system 100 of FIG. 1. Alternatively, integrating one or more of the user movement estimator 140, the gaze target estimator 142, the route estimator 144, the context estimator 152, or the visualization data generator 154 in the device 102 of FIG. 1 that is distinct from the AR headset 108 enables the AR headset 108 to offload some of the augmented reality visualization tasks and reduces resource consumption (e.g., memory, processing cycles, or both) of the AR headset 108. It should be understood that particular devices configured to perform particular operations are provided as illustrative examples. In other examples, one or more of the operations described herein may be performed by one or more devices.

Figure 7:
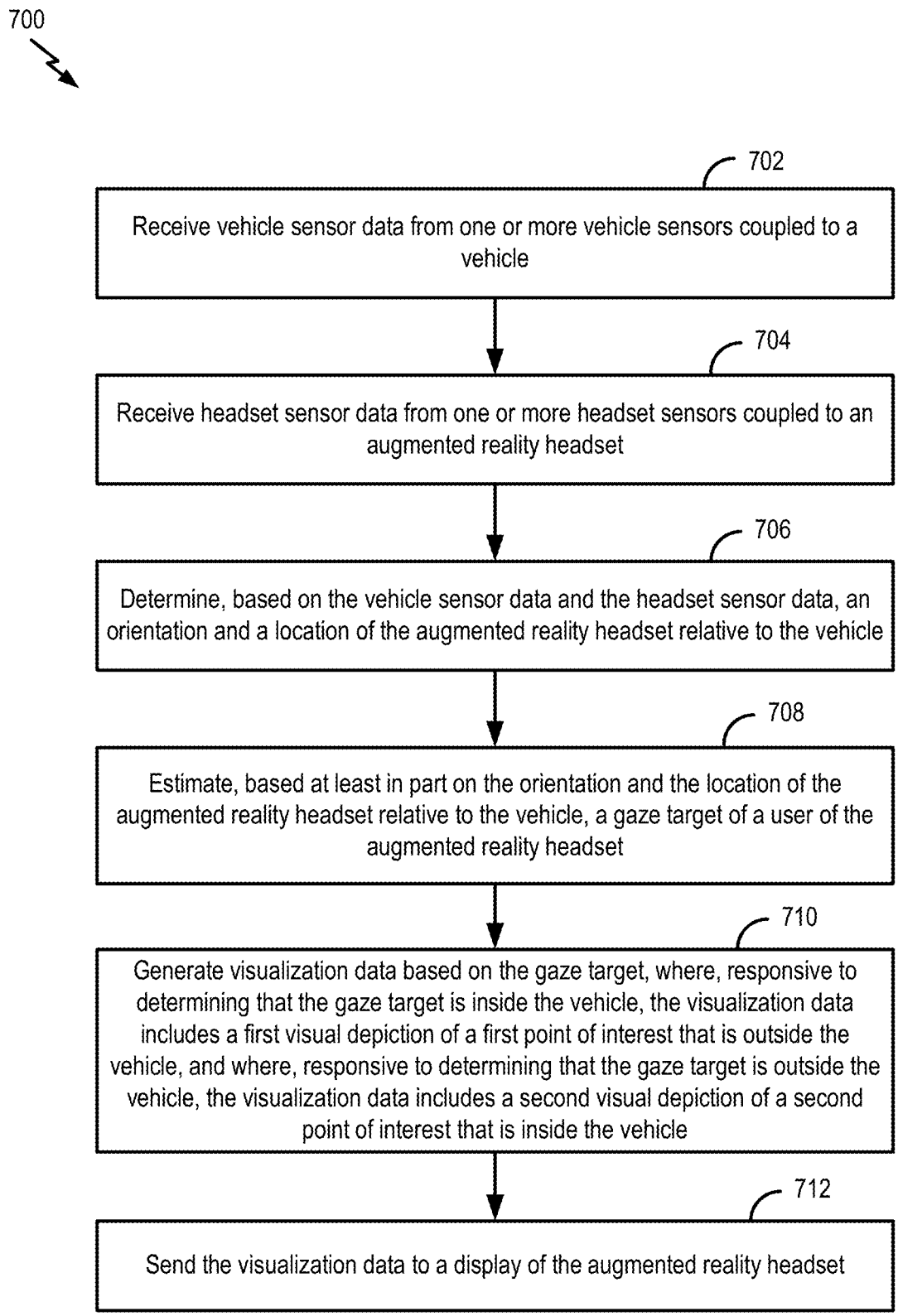
FIG. 7 is a flow chart that illustrates an example of a method of augmented reality visualization.

FIG. 7 illustrates an example of a method 700 of augmented reality visualization. In a particular aspect, the method 700 is performed by the user movement estimator 140, the gaze target estimator 142, the route estimator 144, the context estimator 152, the visualization data generator 154, the processor 134, the interface 130, the device 102 of FIG. 1, the AR headset 608 of FIG. 6, or a combination thereof.

The method 700 includes receiving vehicle sensor data from one or more vehicle sensors coupled to a vehicle, at 702. For example, the interface 130 of FIG. 1 receives the VS data 159 from the vehicle sensor 162, as described with reference to FIG. 1. The vehicle sensor 162 is coupled to the vehicle 104 of FIG. 1.

The method 700 also includes receiving headset sensor data from one or more headset sensors coupled to an augmented reality headset, at 704. For example, the interface 130 of FIG. 1 receives the HS data 141 from the headset sensor 131, as described with reference to FIG. 1. The headset sensor 131 is coupled to the AR headset 108 of FIG. 1.

The method 700 further includes determining, based on the vehicle sensor data and the headset sensor data, an orientation and a location of the augmented reality headset relative to the vehicle, at 706. For example, the gaze target estimator 142 of FIG. 1 determines, based on the VS data 159 and the HS data 141, the headset orientation 115 and the headset location 113 of the AR headset 108 relative to the vehicle 104, as described with reference to FIG. 1.

In a particular aspect, the method 700 includes determining, based on the vehicle sensor data, a movement of the vehicle. For example, the user movement estimator 140 of FIG. 1 determines, based on the VS data 159, the vehicle movement 105 of the vehicle 104, as described with reference to FIG. 1.

The method 700 also includes determining, based on the headset sensor data, a movement of the augmented reality headset. For example, the user movement estimator 140 of FIG. 1 determines, based on the HS data 141, a headset movement 109 of the AR headset 108, as described with reference to FIG. 1.

The method 700 further includes estimating, based on a comparison of the movement of the vehicle and the movement of the augmented reality headset, a user portion of the movement of the augmented reality headset caused by a movement of a head of a user of the augmented reality headset and not caused by the movement of the vehicle. For example, the user movement estimator 140 of FIG. 1 estimates, based on a comparison of the vehicle movement 105 and the headset movement 109, a user movement 111 (e.g., a user portion of the headset movement 109) caused by a movement of a head of a user 101 of the AR headset 108 and not caused by the vehicle movement 105, as described with reference to FIG. 1. The headset orientation 115 and the headset location 113 are determined based on the user movement 111, as described with reference to FIG. 1.

The method 700 also includes estimating, based at least in part on the orientation and the location of the augmented reality headset relative to the vehicle, a gaze target of a user of the augmented reality headset, at 708. For example, the gaze target estimator 142 of FIG. 1 determines, based at least in part on the headset orientation 115 and the headset location 113, the gaze target 127 of the user 101 of the AR headset 108, as described with reference to FIG. 1.

In a particular aspect, the method 700 includes determining, based on the headset sensor data, whether the user is in the vehicle. For example, the context estimator 152 of FIG. 1 determines, based on the HS data 141, whether the user 101 is in the vehicle 104, as described with reference to FIG. 1. The gaze target estimator 142, responsive to the determination that the user 101 is in the vehicle 104, estimates the gaze target 127 based on the headset orientation 115 and the headset location 113.

The method 700 further includes generating visualization data based on the gaze target, at 710. For example, the visualization data generator 154 of FIG. 1 generates the visualization data 155 based on the gaze target 127, as described with reference to FIG. 1. Responsive to determining that the gaze target 127 is inside the vehicle 104, the visualization data 155 includes the visual depiction 203 of the POI 164 that is outside the vehicle 104, as described with reference to FIGS. 1-2. Responsive to determining that the gaze target 127 is outside the vehicle 104, the visualization data 155 includes the visual depiction 205 of the POI 166 that is inside the vehicle 104, as described with reference to FIGS. 1-2.

The method 700 further includes sending the visualization data to a display of the augmented reality headset, at 712. For example, the visualization data generator 154 of FIG. 1 sends the visualization data 155 to a display of the AR headset 108, as described with reference to FIG. 1.

The method 700 thus enables determining a user portion of a movement of an AR headset that is caused by a movement of a head of a user of the AR headset and not caused by a movement of a vehicle that the user is in. The method 700 also enables visualization data to include visual elements that are selected based on context, e.g., whether the gaze target is inside the vehicle or outside the vehicle. The visual elements can be displayed in a field of view of the user, enabling the user to access relevant information without having to transition between contexts and without having to have access to fixed displays. When the user does transition between contexts, a mental workload associated with the transition is reduced.

Figure 8:
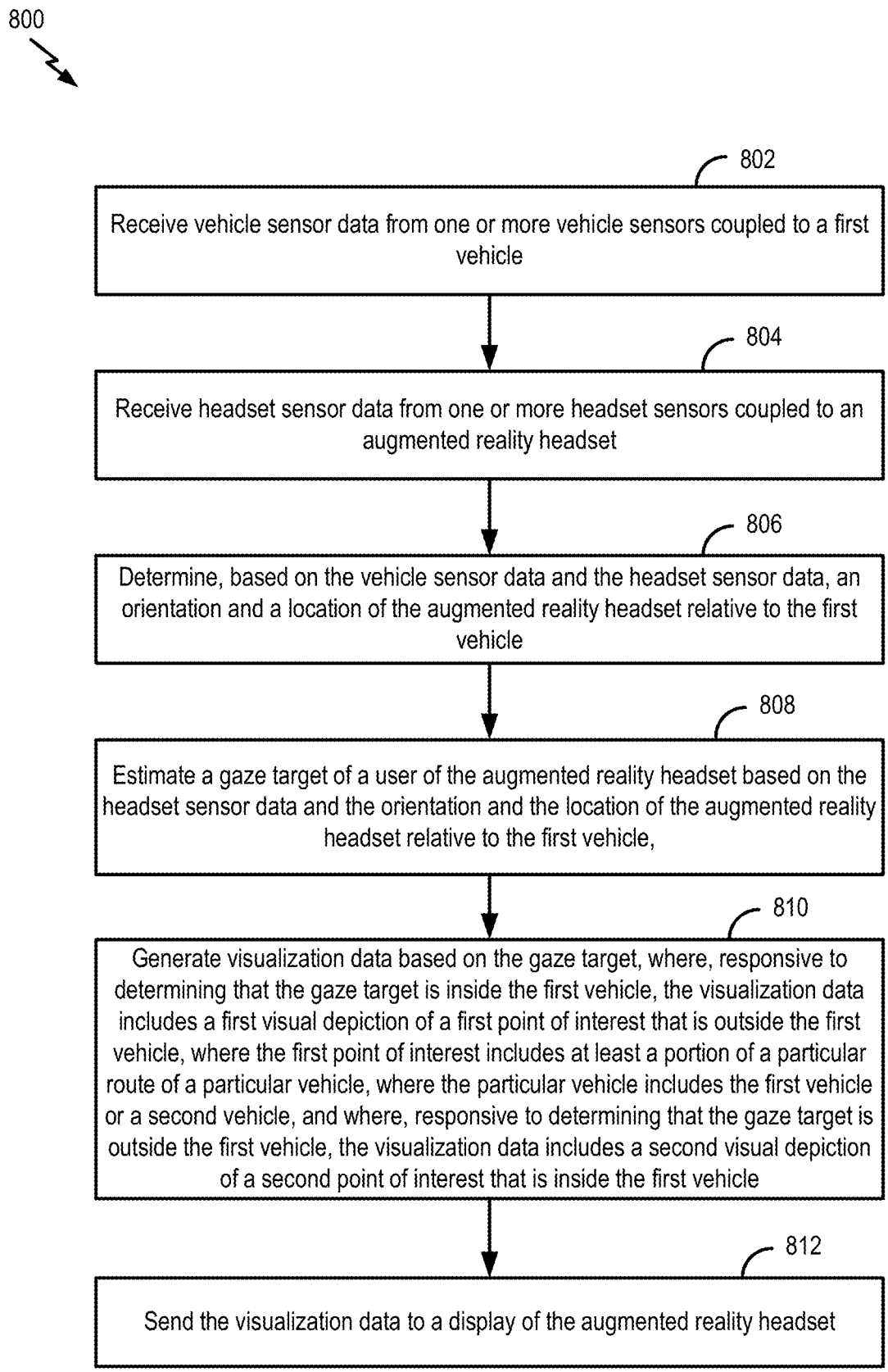
FIG. 8 is a flow chart that illustrates another example of a method of augmented reality visualization.

FIG. 8 illustrates an example of a method 800 of augmented reality visualization. In a particular aspect, the method 800 is performed by the user movement estimator 140, the gaze target estimator 142, the route estimator 144, the context estimator 152, the visualization data generator 154, the processor 134, the interface 130, the device 102 of FIG. 1, the AR headset 608 of FIG. 6, or a combination thereof.

The method 800 includes receiving vehicle sensor data from one or more vehicle sensors coupled to a first vehicle, at 802. For example, the interface 130 of FIG. 1 receives the VS data 159 from the vehicle sensor 162, as described with reference to FIG. 1. The vehicle sensor 162 is coupled to the vehicle 104 of FIG. 1.

The method 800 also includes receiving headset sensor data from one or more headset sensors coupled to an augmented reality headset, at 804. For example, the interface 130 of FIG. 1 receives the HS data 141 from the headset sensor 131, as described with reference to FIG. 1. The headset sensor 131 is coupled to the AR headset 108 of FIG. 1.

The method 800 further includes determining, based on the vehicle sensor data and the headset sensor data, an orientation and a location of the augmented reality headset relative to the first vehicle, at 706. For example, the gaze target estimator 142 of FIG. 1 determines, based on the VS data 159 and the HS data 141, the headset orientation 115 and the headset location 113 of the AR headset 108 relative to the vehicle 104, as described with reference to FIG. 1.

In a particular aspect, the method 800 includes determining, based on the vehicle sensor data, a movement of the first vehicle. For example, the user movement estimator 140 of FIG. 1 determines, based on the VS data 159, the vehicle movement 105 of the vehicle 104, as described with reference to FIG. 1.

The method 800 also includes determining, based on the headset sensor data, a movement of the augmented reality headset. For example, the user movement estimator 140 of FIG. 1 determines, based on the HS data 141, a headset movement 109 of the AR headset 108, as described with reference to FIG. 1.

The method 800 further includes estimating, based on a comparison of the movement of the first vehicle and the movement of the augmented reality headset, a user portion of the movement of the augmented reality headset caused by a movement of the head of a user of the augmented reality headset and not caused by the movement of the first vehicle. For example, the user movement estimator 140 of FIG. 1 estimates, based on a comparison of the vehicle movement 105 and the headset movement 109, a user movement 111 (e.g., a user portion of the headset movement 109) caused by a movement of the head of a user 101 of the AR headset 108 and not caused by the vehicle movement 105, as described with reference to FIG. 1. The headset orientation 115 and the headset location 113 are determined based on the user movement 111, as described with reference to FIG. 1.

The method 800 also includes estimating a gaze target of a user of the augmented reality headset based on the headset sensor data and the orientation and the location of the augmented reality headset relative to the first vehicle, at 808. For example, the gaze target estimator 142 of FIG. 1 determines the gaze target 127 of the user 101 of the AR headset 108 based on the HS data 141 and the headset orientation 115 and the headset location 113, as described with reference to FIG. 1.

In a particular aspect, the method 800 includes determining, based on the headset sensor data, whether the user is in the first vehicle. For example, the context estimator 152 of FIG. 1 determines, based on the HS data 141, whether the user 101 is in the vehicle 104, as described with reference to FIG. 1. The gaze target estimator 142, responsive to the determination that the user 101 is in the vehicle 104, estimates the gaze target 127 based on the headset orientation 115 and the headset location 113.

The method 800 further includes generating visualization data based on the gaze target, at 810. For example, the visualization data generator 154 of FIG. 1 generates the visualization data 155 based on the gaze target 127, as described with reference to FIG. 1. Responsive to determining that the gaze target 127 is inside the vehicle 104, the visualization data 155 includes the visual depiction 302 of a first POI (e.g., one or more portions of the planned route 180B), the visual depiction 402 of a second POI (e.g., one or more portions of the planned route 180A), or both, that are outside the vehicle 104, as described with reference to FIGS. 1 and 3-4. The first POI includes at least a portion of a particular route of a vehicle 106. The second POI includes at least a portion of a particular route of a vehicle 104. Responsive to determining that the gaze target 127 is outside the vehicle 104, the visualization data 155 includes the visual depiction 205 of the POI 166 that is inside the vehicle 104, as described with reference to FIGS. 1-2.

The method 800 further includes sending the visualization data to a display of the augmented reality headset, at 812. For example, the visualization data generator 154 of FIG. 1 sends the visualization data 155 to a display of the AR headset 108, as described with reference to FIG. 1.

The method 800 thus enables visualization data to include visual elements that are selected based on context, e.g., whether the gaze target is inside the vehicle or outside the vehicle. The visual elements indicate one or more routes of the vehicle, another vehicle, or both. The visual elements can be displayed in a field of view of the user, enabling the user to access relevant information without having to transition between contexts and without having to have access to fixed displays. When the user does transition between contexts, a mental workload associated with the transition is reduced.

Figure 9:
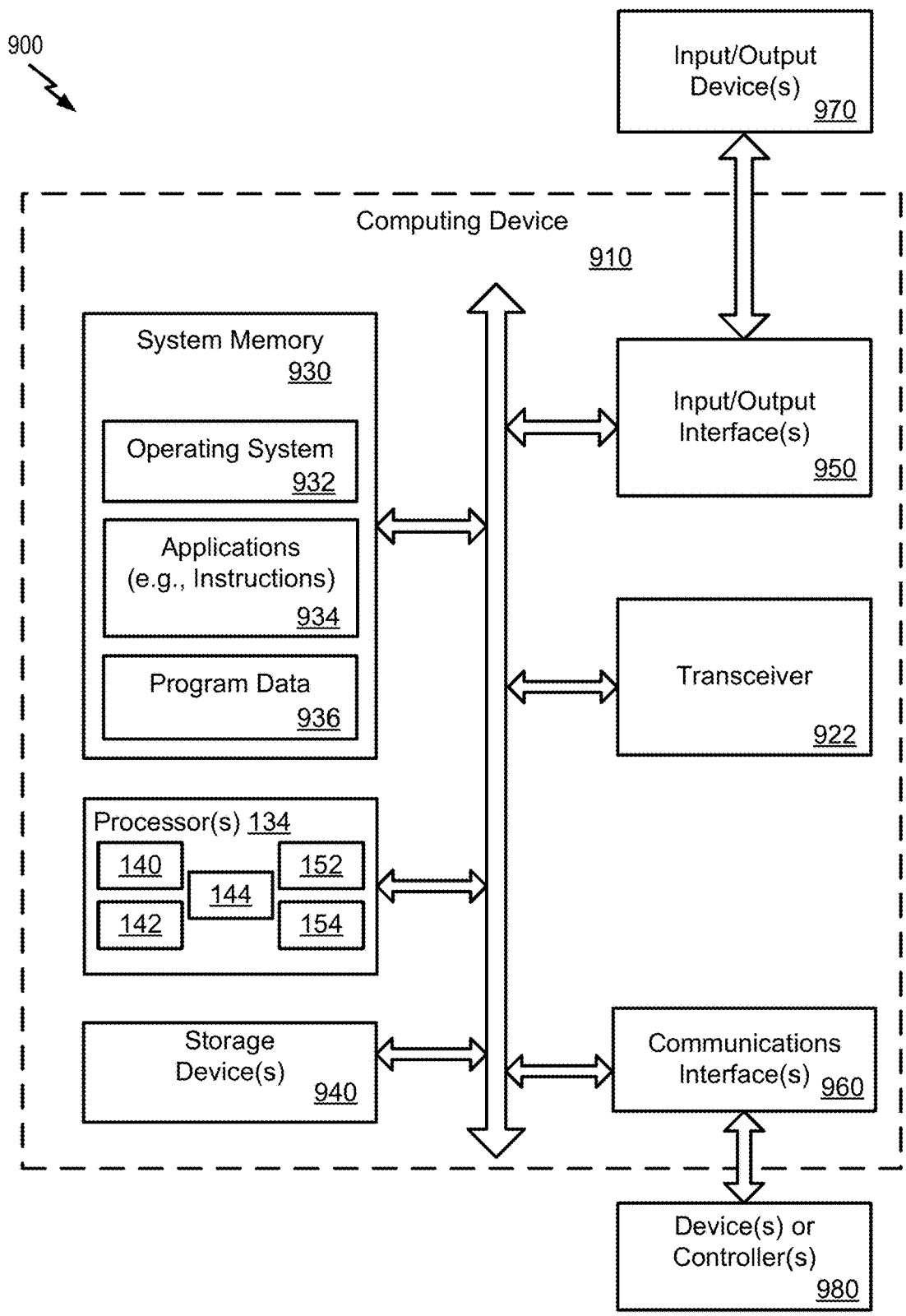
FIG. 9 is a block diagram that depicts a computing environment including a computing device configured to support aspects of computer-implemented methods and computer-executable program instructions (or code) according to the present disclosure.

FIG. 9 is an illustration of a block diagram of a computing environment 900 including a computing device 910 configured to support aspects of computer-implemented methods and computer-executable program instructions (or code) according to the present disclosure. For example, the computing device 910, or portions thereof, is configured to execute instructions to initiate, perform, or control one or more operations described with reference to FIG. 1-8. In a particular aspect, the computing device 910 corresponds to the device 102, the AR headset 108, the vehicle 104 of FIG. 1, the AR headset 608 of FIG. 6, or a combination thereof.

The computing device 910 includes the processor 134. The processor 134 is configured to communicate with system memory 930, one or more storage devices 940, one or more input/output interfaces 950, a transceiver 922, one or more communications interfaces 960, or a combination thereof. The system memory 930 includes volatile memory devices (e.g., random access memory (RAM) devices), nonvolatile memory devices (e.g., read-only memory (ROM) devices, programmable read-only memory, and flash memory), or both. The system memory 930 stores an operating system 932, which may include a basic input/output system for booting the computing device 910 as well as a full operating system to enable the computing device 910 to interact with users, other programs, and other devices. The system memory 930 stores system (program) data 936. In a particular aspect, the memory 132 of FIG. 1 includes the system memory 930, the one or more storage devices 940, or a combination thereof. In a particular aspect, the system (program) data 936 includes the data 103 of FIG. 1. In a particular aspect, the data 103 includes (e.g., indicates) the alert 181, the visualization data 155, the context configuration data 167, the route goal 194, the map data 135, the headset orientation 115, the vehicle map data 133, the gaze target 127, the context 137, the one or more routes 178, the headset location 113, the user movement 111, the vehicle movement 105, the headset movement 109, the VS data 159, the HS data 141, the planned route data 191, the location data 193, or a combination thereof.

The system memory 930 includes one or more applications 934 executable by the processor 134. As an example, the one or more applications 934 include instructions executable by the processor 134 to initiate, control, or perform one or more operations described with reference to FIG. 1-8. To illustrate, the one or more applications 934 include instructions executable by the processor 134 to initiate, control, or perform one or more operations described with reference to the user movement estimator 140, the gaze target estimator 142, the route estimator 144, the context estimator 152, the visualization data generator 154, or a combination thereof.

The processor 134 is configured to communicate with one or more storage devices 940. For example, the one or more storage devices 940 include nonvolatile storage devices, such as magnetic disks, optical disks, or flash memory devices. In a particular example, the storage devices 940 include both removable and non-removable memory devices. The storage devices 940 are configured to store an operating system, images of operating systems, applications, and program data. In a particular aspect, the system memory 930, the storage devices 940, or both, include tangible computer-readable media. In a particular aspect, one or more of the storage devices 940 are external to the computing device 910.

The processor 134 is configured to communicate with one or more input/output interfaces 950 that enable the computing device 910 to communicate with one or more input/output devices 970 to facilitate user interaction. The processor 134 is configured to detect interaction events based on user input received via the input/output interfaces 950. The processor 134 is configured to communicate with devices or controllers 980 via the one or more communications interfaces 960. For example, the one or more communications interfaces 960 include the interface 130 of FIG. 1 and the devices or controllers 980 include the AR headset 108, the headset sensor 131, the vehicle 104, the vehicle sensor 162, the one or more data sources 192, or a combination thereof. In an illustrative example, a non-transitory computer-readable storage medium (e.g., the system memory 930) includes instructions that, when executed by a processor (e.g., the processor 134), cause the processor to initiate, perform, or control operations. The operations include one or more operations described with reference to FIG. 1-8.

Although one or more of FIG. 1-9 illustrate systems, apparatuses, and/or methods according to the teachings of the disclosure, the disclosure is not limited to these illustrated systems, apparatuses, and/or methods. One or more functions or components of any of FIG. 1-9 as illustrated or described herein may be combined with one or more other portions of another of FIG. 1-9. For example, one or more elements of the method 700 of FIG. 7, one or more elements of the method 800 of FIG. 8, or a combination thereof, may be performed in combination with other operations described herein. Accordingly, no single implementation described herein should be construed as limiting and implementations of the disclosure may be suitably combined without departing form the teachings of the disclosure. As an example, one or more operations described with reference to FIG. 1-9 may be optional, may be performed at least partially concurrently, and/or may be performed in a different order than shown or described.

Examples described above are illustrative and do not limit the disclosure. It is to be understood that numerous modifications and variations are possible in accordance with the principles of the present disclosure. The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

The invention claimed is:

1. A device for augmented reality visualization, the device comprising:
   an interface configured to:
   receive vehicle sensor data from one or more vehicle sensors coupled to a first vehicle; and
   receive headset sensor data from one or more headset sensors coupled to an augmented reality headset; and
   one or more processors configured to:
   determine, based on the vehicle sensor data and the headset sensor data, an orientation and a location of the augmented reality headset relative to the first vehicle;
   estimate a gaze target of a user of the augmented reality headset based on the headset sensor data and the orientation and the location of the augmented reality headset relative to the first vehicle;
   generate visualization data based on the gaze target, wherein, responsive to determining that the gaze target is inside the first vehicle, the visualization data includes a first visual depiction of a first point of interest that is outside the first vehicle, wherein the first point of interest includes at least a portion of a particular route of a particular vehicle, wherein the particular vehicle includes the first vehicle or a second vehicle, and wherein, responsive to determining that the gaze target is outside the first vehicle, the visualization data includes a second visual depiction of a second point of interest that is inside the first vehicle; and
   send the visualization data to a display of the augmented reality headset.

2. The device of claim 1, wherein the one or more processors are further configured to:
  determine, based on the vehicle sensor data, a movement of the first vehicle;
  determine, based on the headset sensor data, a movement of the augmented reality headset;
  estimate, based on a comparison of the movement of the first vehicle and the movement of the augmented reality headset, a user portion of the movement of the augmented reality headset caused by a movement of a head of the user of the augmented reality headset and not caused by the movement of the first vehicle; and
  determine, based on the user portion of the movement of the augmented reality headset, the orientation and the location of the augmented reality headset relative to the first vehicle.

3. The device of claim 1, wherein the particular vehicle includes the second vehicle, wherein the interface is further configured to receive location data indicating a traversed route of the second vehicle from a first location to a second location.

4. The device of claim 3, wherein the particular route includes the traversed route.

5. The device of claim 3, wherein the one or more processors are configured to determine an interpolated route of the second vehicle from the second location to an estimated location, wherein determining the interpolated route includes performing an interpolation based on the second location and the vehicle sensor data, and wherein the particular route includes the interpolated route.

6. The device of claim 1, further comprising a memory configured to store location data indicating a traversed route of the first vehicle from a first location to an estimated location.

7. The device of claim 6, wherein the particular route includes the traversed route.

8. The device of claim 1, wherein the interface is further configured to receive planned route data indicating a planned route of the particular vehicle from an origin to a destination.

9. The device of claim 8, wherein the particular route includes the planned route.

10. The device of claim 8, wherein the one or more processors are configured to determine a forecasted route of the particular vehicle from an estimated location of the particular vehicle to a forecasted location on the planned route, wherein the forecasted route is based on the estimated location, the vehicle sensor data, vehicle capability data, external conditions data, or a combination thereof, and wherein the particular route includes the forecasted route.

11. The device of claim 1, wherein the one or more processors are configured to determine a recommended route of the first vehicle to satisfy a route goal, the recommended route is from an estimated location of the first vehicle to a recommended location on a planned route of the first vehicle, and wherein the particular route includes the recommended route.

12. The device of claim 11, wherein the route goal includes obstacle avoidance, collision avoidance, bad weather avoidance, an area avoidance, a time goal, a fuel consumption goal, a cost goal, or a combination thereof.

13. The device of claim 1, wherein the one or more vehicle sensors include a radar, a sonar, an accelerometer, a gyroscope, a magnetometer, an inertial measurement unit, an image sensor, a global positioning system (GPS) receiver, a beacon, or a combination thereof.

14. The device of claim 1, wherein the first visual depiction of the first point of interest that is outside the first vehicle indicates a time of a location of the particular vehicle along the particular route.

15. The device of claim 14, wherein the location of the particular vehicle includes a detected location, an interpolated location, a forecasted location, or a recommended location.

16. A method of augmented reality visualization, the method comprising:
  receiving, at a device, vehicle sensor data from one or more vehicle sensors coupled to a first vehicle;
  receiving, at the device, headset sensor data from one or more headset sensors coupled to an augmented reality headset;
  determining, based on the vehicle sensor data and the headset sensor data, an orientation and a location of the augmented reality headset relative to the first vehicle;
  estimating, at the device, a gaze target of a user of the augmented reality headset based on the headset sensor data and the orientation and the location of the augmented reality headset relative to the first vehicle;
  generating, at the device, visualization data based on the gaze target, wherein, responsive to determining that the gaze target is inside the first vehicle, the visualization data includes a first visual depiction of a first point of interest that is outside the first vehicle, wherein the first point of interest includes at least a portion of a particular route of a particular vehicle, wherein the particular vehicle includes the first vehicle or a second vehicle, and wherein, responsive to determining that the gaze target is outside the first vehicle, the visualization data includes a second visual depiction of a second point of interest that is inside the first vehicle; and
  sending the visualization data from the device to a display of the augmented reality headset.

17. The method of claim 16, wherein, responsive to determining that the gaze target is outside the first vehicle, the visualization data further includes a visual indicator of a location of the first point of interest that is outside the first vehicle.

18. The method of claim 17, wherein the first visual depiction and the visual indicator include at least one visual element in common, and wherein the visual element includes a color, an image, a video, an animation, a symbol, text, a pattern, or a combination thereof.

19. A non-transitory computer-readable storage device storing instructions that, when executed by one or more processors, cause the one or more processors to:
  receive vehicle sensor data from one or more vehicle sensors coupled to a first vehicle;
  receive headset sensor data from one or more headset sensors coupled to an augmented reality headset;
  determine, based on the vehicle sensor data and the headset sensor data, an orientation and a location of the augmented reality headset relative to the first vehicle;
  estimate a gaze target of a user of the augmented reality headset based on the headset sensor data and the orientation and the location of the augmented reality headset relative to the first vehicle;
  generate visualization data based on the gaze target, wherein, responsive to determining that the gaze target is inside the first vehicle, the visualization data includes a first visual depiction of a first point of interest that is outside the first vehicle, wherein the first point of interest includes at least a portion of a particular route of a particular vehicle, wherein the particular vehicle includes the first vehicle or a second vehicle, and wherein, responsive to determining that the gaze target is outside the first vehicle, the visualization data includes a second visual depiction of a second point of interest that is inside the first vehicle; and send the visualization data to a display of the augmented reality headset.

20. The non-transitory computer-readable storage device of claim 19, wherein the particular vehicle includes the second vehicle, and wherein the instructions, when executed by the one or more processors, further cause the one or more processors to:

receive location data indicating a traversed route of the second vehicle from a first location to a second location; and determine an interpolated route of the second vehicle from the second location to an estimated location, wherein determining the interpolated route includes performing an interpolation based on the second location and the vehicle sensor data, wherein the particular route includes the interpolated route, and wherein the vehicle sensor data includes radar data, sonar data, or a combination thereof.

\* \* \* \* \*